(12) United States Patent
Verhoef et al.

(10) Patent No.: US 11,785,890 B2
(45) Date of Patent: Oct. 17, 2023

(54) CORN HEAD ADJUSTMENT SYSTEM WITH INTEGRATED ACTUATION

(71) Applicant: Deere & Company, Moline, IL (US)

(72) Inventors: Todd M. Verhoef, Coal Valley, IL (US); Nathan E. Krehbiel, Bettendorf, IA (US); Troy M. Heims, East Moline, IL (US); Mitchel J. Lindberg, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 376 days.

(21) Appl. No.: 17/228,125

(22) Filed: Apr. 12, 2021

(65) Prior Publication Data

US 2021/0392814 A1 Dec. 23, 2021

Related U.S. Application Data

(60) Provisional application No. 63/040,263, filed on Jun. 17, 2020.

(51) Int. Cl.
*A01D 41/14* (2006.01)
*A01D 45/02* (2006.01)
*A01B 73/04* (2006.01)

(52) U.S. Cl.
CPC .......... *A01D 41/144* (2013.01); *A01B 73/044* (2013.01); *A01D 45/021* (2013.01)

(58) Field of Classification Search
CPC ... A01D 41/144; A01D 45/021; A01B 73/044
See application file for complete search history.

(56) References Cited

U.S. PATENT DOCUMENTS

| 4,320,805 A | 3/1982 | Winter |
| 4,355,690 A | 10/1982 | Jensen et al. |

(Continued)

FOREIGN PATENT DOCUMENTS

| DE | 8534520 U1 | 1/1986 |
| EP | 0044569 B1 | 6/1984 |
| EP | 1142467 | 6/2004 |

OTHER PUBLICATIONS

John Deere, 712FC Folding Corn Head Brochure, undated admitted prior art.

(Continued)

*Primary Examiner* — Thomas B Will
*Assistant Examiner* — Julia C Tran
(74) *Attorney, Agent, or Firm* — KLINTWORTH & ROZENBLAT IP LLP

(57) ABSTRACT

A corn head corn head includes a first wing segment and a center segment. A corn head adjustment system includes a first fold actuator; a first deck plate actuator mounted on at least one of the first wing segment frame or the center frame and configured to reposition at least one of the first deck plate rod or the center deck plate rod; and corn head hydraulics. During a fold process, the corn head hydraulics is configured to actuate the first fold actuator in order to fold the first wing segment relative to the center segment and to actuate the first deck plate actuator in order to decouple the first deck plate rod from the center deck plate rod. During an unfold process, the corn head hydraulics is configured to actuate the first fold actuator in order to unfold the first wing segment relative to the center segment.

20 Claims, 21 Drawing Sheets

(56) References Cited

U.S. PATENT DOCUMENTS

| | | | |
|---|---|---|---|
| 4,409,780 A * | 10/1983 | Beougher | A01B 73/02 56/228 |
| 4,630,526 A | 12/1986 | Burk et al. | |
| 5,673,543 A * | 10/1997 | Richardson | A01D 41/144 56/85 |
| 5,724,798 A * | 3/1998 | Stefl | A01D 41/144 56/119 |
| 9,320,196 B2 | 4/2016 | Dybro et al. | |
| 10,405,482 B2 | 9/2019 | Ysebaert et al. | |
| 10,433,482 B2 | 10/2019 | Lehman | |
| 10,433,483 B2 | 10/2019 | Cook | |
| 2003/0226342 A1 * | 12/2003 | Boeckmann | A01D 41/144 56/14.7 |
| 2004/0123575 A1 * | 7/2004 | Rickert | A01D 41/144 56/14.7 |
| 2014/0033670 A1 * | 2/2014 | Cressoni | A01D 45/021 56/104 |
| 2014/0075909 A1 | 3/2014 | Bomleny et al. | |
| 2016/0174462 A1 * | 6/2016 | Walker | A01D 45/023 56/119 |
| 2016/0262301 A1 * | 9/2016 | van Vooren | A01D 41/144 |
| 2018/0184592 A1 * | 7/2018 | Lehman | A01D 45/021 |
| 2019/0045709 A1 * | 2/2019 | Schroeder | A01D 41/144 |
| 2019/0104683 A1 * | 4/2019 | Mossman | A01B 73/044 |
| 2019/0129375 A1 | 5/2019 | Peterson et al. | |
| 2019/0364735 A1 | 12/2019 | Braet et al. | |

OTHER PUBLICATIONS

Extended European Search Report and Written Opinion issued in European Patent Application No. 21173874.5, dated Jan. 18, 2022, in 07 pages.

* cited by examiner

CORN HEAD ADJUSTMENT SYSTEM WITH INTEGRATED ACTUATION

CROSS-REFERENCE TO RELATED APPLICATION(S)

This application is a nonprovisional application of, and claims priority to U.S. Provisional Patent Application 63/040,263, filed Jun. 17, 2020 and incorporated herein by reference.

STATEMENT OF FEDERALLY SPONSORED RESEARCH OR DEVELOPMENT

Not applicable.

FIELD OF THE DISCLOSURE

This disclosure relates to a corn head adjustment system for an agricultural operation.

BACKGROUND OF THE DISCLOSURE

Effective and efficient agricultural operation may involve large implements to process multiple rows at a time. One example is a corn head that operates to harvest eight, twelve, or even more rows during a single pass. Some corn heads may be folded to facilitate transport and storage. However, accommodating and implementing the fold and unfold processes may be challenging.

SUMMARY OF THE DISCLOSURE

The disclosure provides a corn head adjustment system.

In one aspect, a corn head configured to be mounted on an agricultural machine is provided. The corn head includes a first wing segment including a first wing segment frame; a first deck plate rod mounted to the first wing segment frame; and a first series of deck plates, at least a portion of which are repositionable upon lateral movement of first deck plate rod. The corn head further includes a center segment arranged proximate to the first wing segment, the center segment including a center frame; a center deck plate rod mounted to the center frame; and a second series of deck plates, at least a portion of which are repositionable upon lateral movement of center deck plate rod. The corn head also includes a corn head adjustment system with a first fold actuator extending between the first wing segment frame and the center frame; a first deck plate actuator mounted on at least one of the first wing segment frame or the center frame and configured to reposition at least one of the first deck plate rod or the center deck plate rod; and corn head hydraulics fluidly coupled to receive a fluid from a source and to direct the fluid to selectively actuate the first fold actuator in order to fold the first wing segment relative to the center segment, to selectively actuate the first fold actuator in order to unfold the first wing segment relative to the center segment, to selectively actuate the first deck plate actuator in order to decouple the first deck plate rod from the center deck plate rod, and to selectively actuate the first deck plate actuator in order to couple the first deck plate rod to the center deck plate rod. During a fold process, the corn head hydraulics is configured to actuate the first fold actuator in order to fold the first wing segment relative to the center segment and to actuate the first deck plate actuator in order to decouple the first deck plate rod from the center deck plate rod. During an unfold process, the corn head hydraulics is configured to actuate the first fold actuator in order to unfold the first wing segment relative to the center segment.

In another aspect, a corn head adjustment system is provided for a corn head with a first wing segment and a center segment arranged proximate to the first wing segment; the first wing segment including a first wing segment frame, a first deck plate rod mounted to the first wing segment frame, and a first series of deck plates, at least a portion of which are repositionable upon lateral movement of first deck plate rod; and the center segment including a center frame, a center deck plate rod mounted to the center frame, and a second series of deck plates, at least a portion of which are repositionable upon lateral movement of center deck plate rod. The corn head adjustment system includes a first fold actuator extending between the first wing segment frame and the center frame; a first deck plate actuator mounted on at least one of the first wing segment frame or the center frame and configured to reposition at least one of the first deck plate rod or the center deck plate rod; and corn head hydraulics fluidly coupled to receive a fluid from a source and to direct the fluid to selectively actuate the first fold actuator in order to fold the first wing segment relative to the center segment, to selectively actuate the first fold actuator in order to unfold the first wing segment relative to the center segment, to selectively actuate the first deck plate actuator in order to decouple the first deck plate rod from the center deck plate rod, and to selectively actuate the first deck plate actuator in order to couple the first deck plate rod to the center deck plate rod. During a fold process, the corn head hydraulics is configured to actuate the first fold actuator in order to fold the first wing segment relative to the center segment and to actuate the first deck plate actuator in order to decouple the first deck plate rod from the center deck plate rod. During an unfold process, the corn head hydraulics is configured to actuate the first fold actuator in order to unfold the first wing segment relative to the center segment.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed system and method, as shown in the accompanying figures of the drawings described briefly above. Various modifications to the example embodiments may be contemplated by one of skill in the art.

Agricultural implements of an agricultural machine, particularly a corn head mounted on a combine or harvester, may be wide in order to processes a number of rows simultaneously to improve operational efficiency. Since the corn head is so wide, it is separated onto one or more portions that enable folding in order to more easily transport and store the agricultural machine. As an example, the corn head may have wing segments mounted on each end of a center segment that fold onto the center segment. The folding and unfolding of the wing segments are implemented hydraulically and may function to accommodate the various operational relationships between the segments.

The present disclosure generally relates to a corn head adjustment system that implements adjustments to various aspects of the corn head. In some examples, the corn head adjustment system may include various types of actuators (e.g., lock actuators, deck plate actuators, and fold actuators) that are hydraulically integrated in order to collectively reposition the actuators with a single command and/or a single fluid pressure source as a sequence during fold and unfold processes. Such actuators may be dual-acting actuators. Further, in some examples, the deck plate actuators may be positioned on each wing segment and cooperate to reposition the deck plates across the corn head. Moreover, in some examples, the corn head adjustment system may implement a resume function at the end of an unfold process in order to return the deck plates to a previous spacing. The hydraulics of the corn head adjustment system may have various types of control mechanisms, including hydraulically activated valves, electrically activated solenoid valves, and combinations thereof.

Further, the corn head adjustment system may include a force reduction or relief arrangement that is activated at the end of a fold process and/or unfold process to reduce the amount of force (or load) that the actuators place on the frames when assisted by gravity. Such force relief arrangements may be activated with a mechanical sensor that determines the relative positions of the frame segments; a sensor integrated into the respective actuators; and/or sensor or pressure elements within the hydraulics. It should be noted that the various examples discussed herein may be implemented as necessary or desired with one another as appropriate.

The following describes one or more example implementations of the disclosed corn head adjustment system, as shown in the accompanying figures of the drawings described briefly above.

Figure 1:
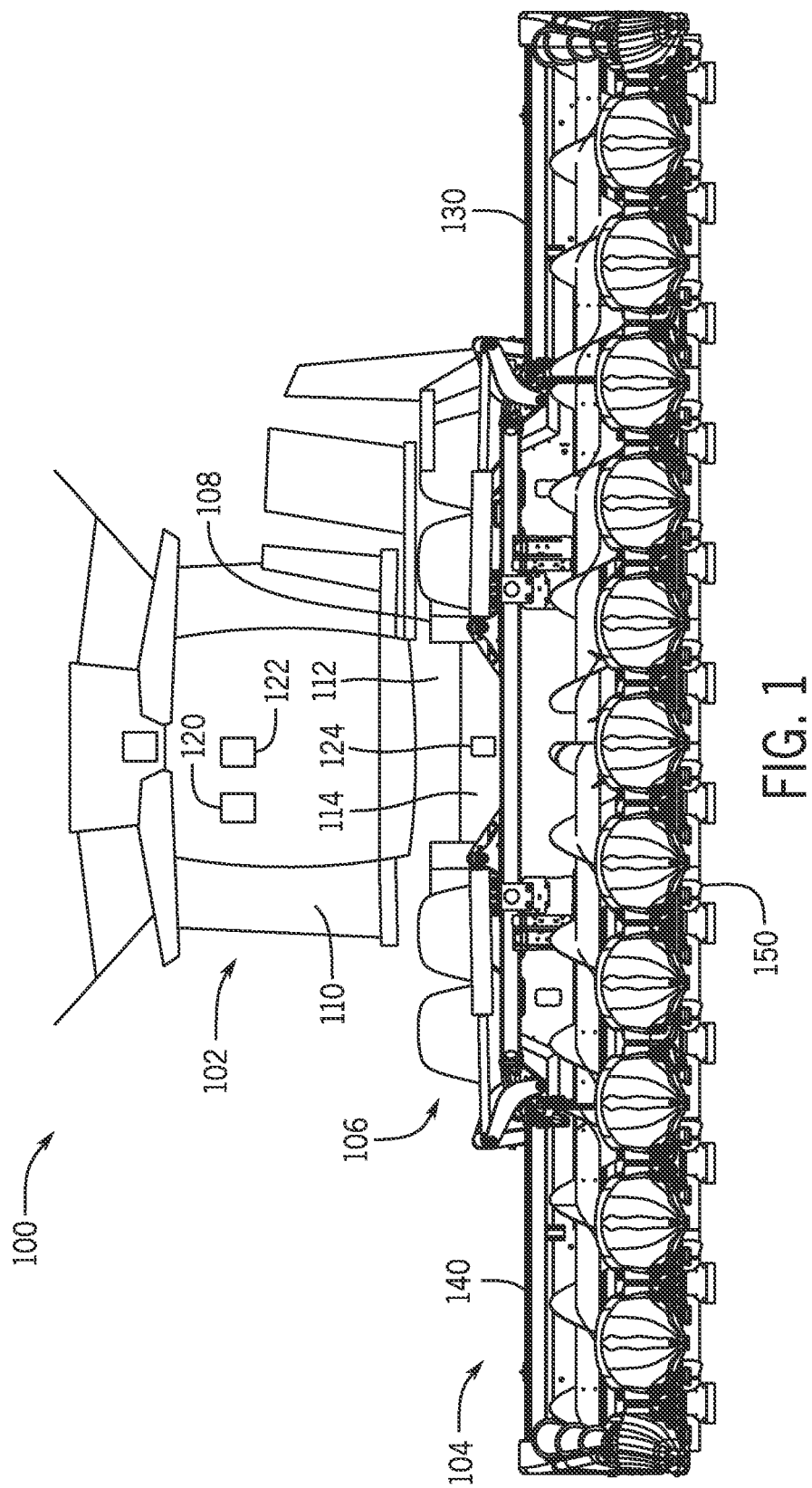
FIG. 1 is a front view of an agricultural machine with a corn head in an unfolded position according to an example.
Figure 2:
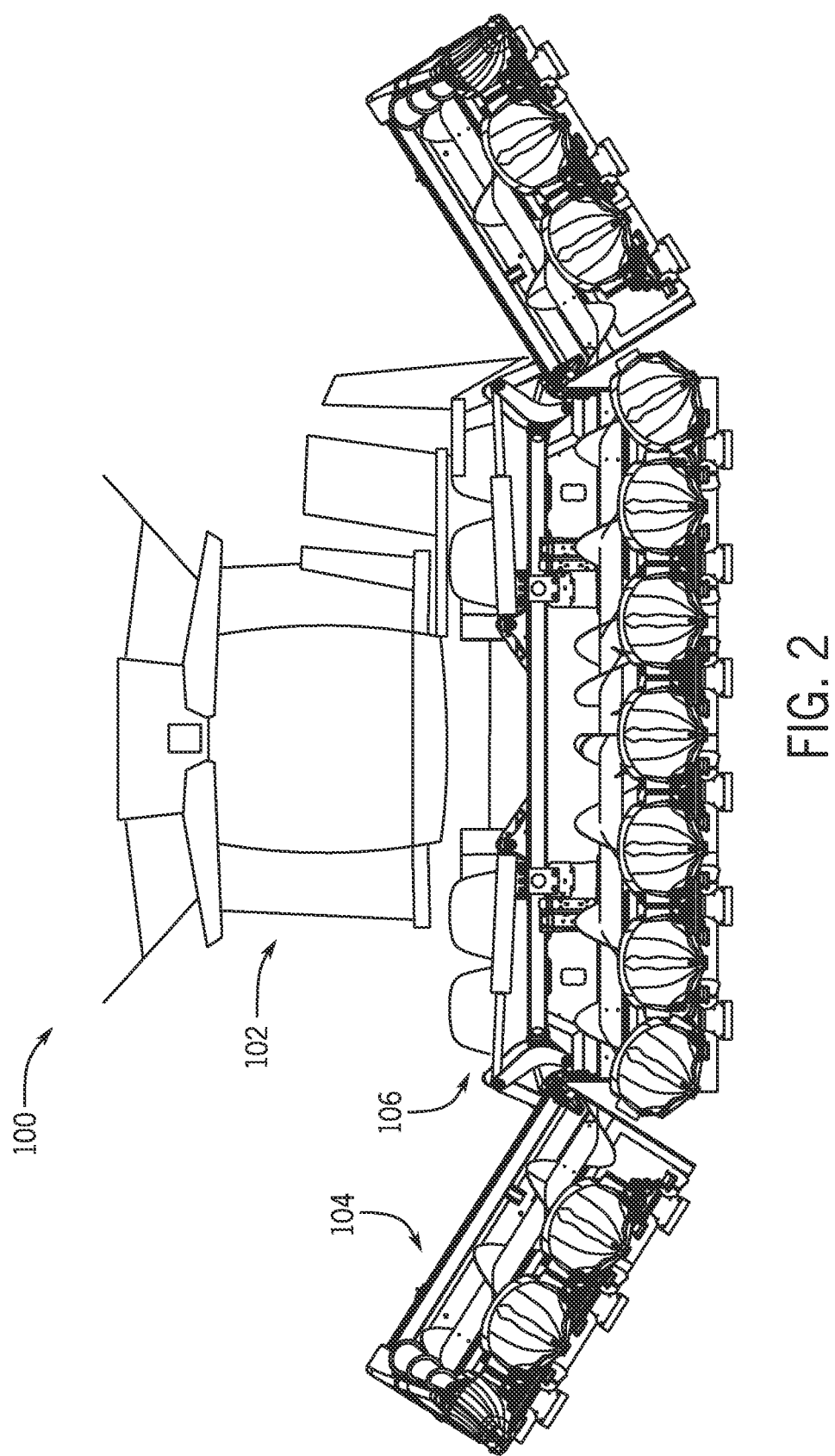
FIG. 2 is a front view of an agricultural machine with the corn head in a partially folded position according to an example.
Figure 3:
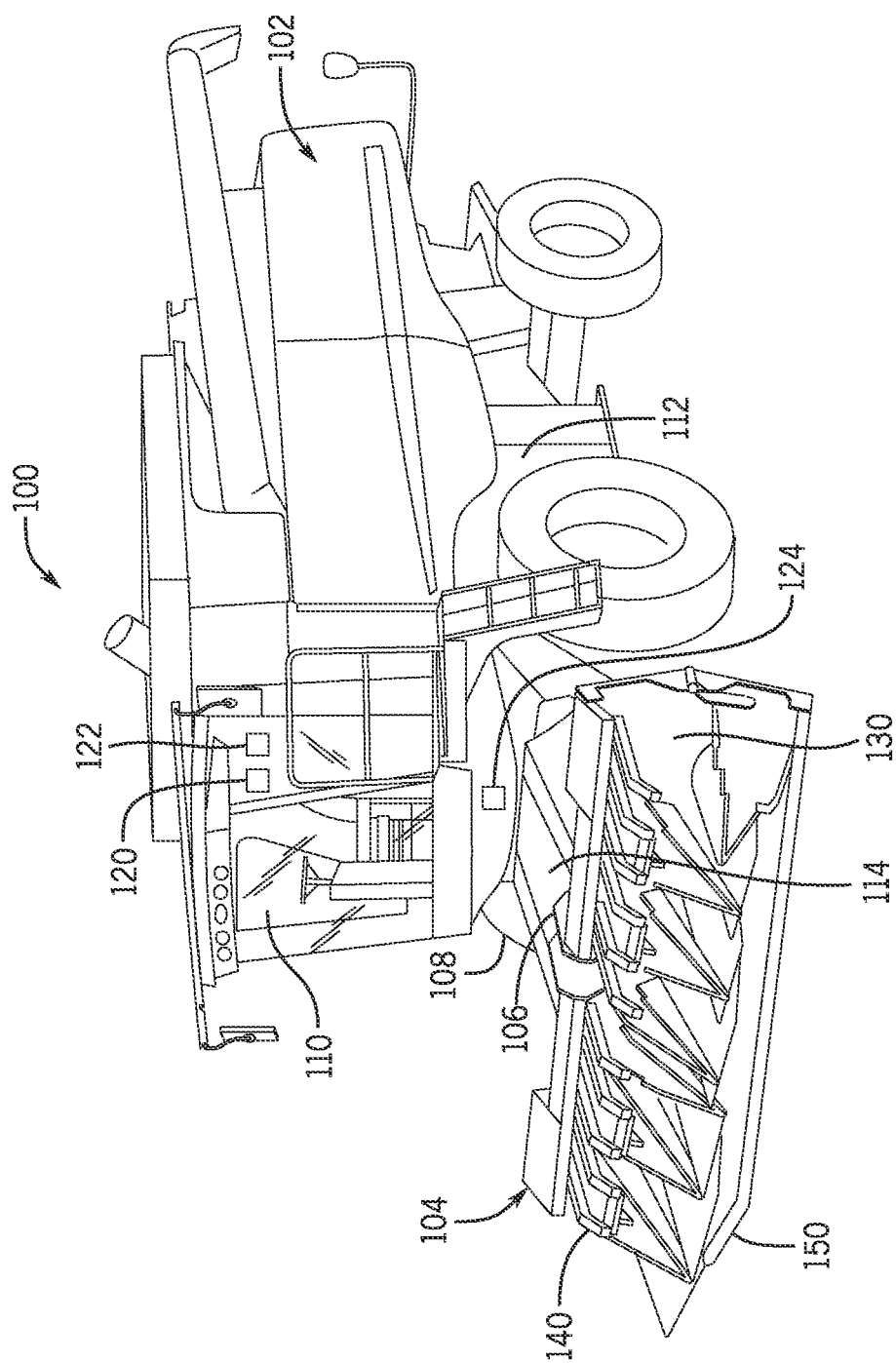
FIG. 3 is an isometric view of the agricultural machine with the corn head in a folded position according to an example.

Reference is now made to FIGS. 1-3, which depict an agricultural machine 100 with a vehicle 102 that supports a work implement, which in this example in a corn head 104 that functions to process corn. Although a corn head 104 is depicted, the examples discussed herein may be applicable to other type of implements.

Briefly, the corn head 104 is formed by a first (or left) wing segment 130, a second (or right) wing segment 140, and a center segment 150. One of wing segments 130, 140 is arranged on each end of the center segment 150, which may be mounted to the vehicle 102 to secure the overall corn head 104. As described in greater detail below, the corn head 104 may be modified or adjusted in various ways by a head adjustment system 106, including into an unfolded state as shown in FIG. 1, in between unfolded and folded states as shown in FIG. 2, and into the folded state as shown in FIG. 3. a folded state. Although the uses may vary, generally, the machine 100 operates in the unfolded position during an agricultural operation (e.g., when collecting and processing corn) and in the folded position during transport or storage of the machine 100. Unless otherwise noted, the left wing segment 130 may be a mirror image of the right wing segment 140 with similar components, as may be the case with the left and right sides of the center segment 150. Additional details regarding the corn head 104 and head adjustment system 106 are provided below.

Generally, the work vehicle 102 includes a vehicle frame 108 supporting the cab 110 and a powertrain 112 supported on the vehicle frame 108 that generates power for propulsion and/or other tasks to be performed by the work vehicle 102. In one example, the powertrain 112 may include an engine, transmission, steering system, wheels, and the like for propelling and maneuvering the work vehicle 102, either autonomously or based on commands by the operator. In one example, work vehicle 102 may include a hydraulic system (generally "vehicle hydraulics") 114 in which power generated by the powertrain 112 is distributed via fluid pressure to perform various functions on the work vehicle 102 and/or the corn head 104. Additional details regarding the vehicle hydraulics 114 are provided below. Although not shown, the work vehicle 102 may include various other components or systems that are typical on work vehicles. Examples include actuation systems, lubrication and cooling systems, battery systems, exhaust treatment systems, braking systems, and the like.

The agricultural machine 100 may further include a controller 120 to perform and implement one or more functions associated with operating the work vehicle 102 and/or corn head 104. For example, the vehicle controller 120 may also facilitate automatic or manual maneuvering of the vehicle traversing the field and actuation of the processing elements of the vehicle 102 and/or corn head 104. As another example, the controller 120 may operate to control the elements that process the corn on the corn head 104 and/or within the work vehicle 102. Additionally, the controller 120 may facilitate operation of the corn head adjustment system 106, as described below.

Generally, the vehicle controller 120 (or others) may be configured as a computing device with associated processor devices and memory architectures, as a hard-wired computing circuit (or circuits), as a programmable circuit, as a hydraulic, electrical or electro-hydraulic controller, or otherwise. As such, the vehicle controller 120 may be configured to execute various computational and control functionality with respect to the work vehicle 102, the corn head 104, and/or the head adjustment system 106. In some embodiments, the vehicle controller 120 may be configured to receive input signals in various formats from a number of sources (e.g., including from the operator via operator interfaces 122, one or more sensors 124, units, and systems onboard or remote from the machine 100); and in response, the vehicle controller 120 generates one or more types of commands for implementation by the various systems on or outside the agricultural machine 100.

In some embodiments, the vehicle controller 120 may be configured to receive input commands and to interface with an operator via human-vehicle interfaces in the forms of one or more operator interfaces 122, which may be disposed inside the cab 110 of the work vehicle 102 for easy access by the vehicle operator. The operator interfaces 122 may be configured in a variety of ways, including one or more joysticks, various switches or levers, one or more buttons, a touchscreen interface, a keyboard, a speaker, a microphone associated with a speech recognition system, or various other human-machine interface devices. As described in greater detail below, the operator may use the operator interfaces 122 to command or otherwise implement the adjustment of various aspects of the corn head 104 in association with the corn head adjustment system 106, including wing folding and unfolding, as well as wing locking and deck plate adjustments.

As schematically shown, the work machine 100 may include one or more sensors 124 on the work vehicle 102 and/or corn head 104 that function to collect information associated with the agricultural machine 100 and the associated environment. Such information may be provided to the vehicle controller 120 for use by the corn head adjustment system 106. In one example, discussed below, the sensor 124 includes one or more actuator sensors, wing position sensors, and/or deck plate sensors. Other sensors and associated components may be provided.

Figure 4:
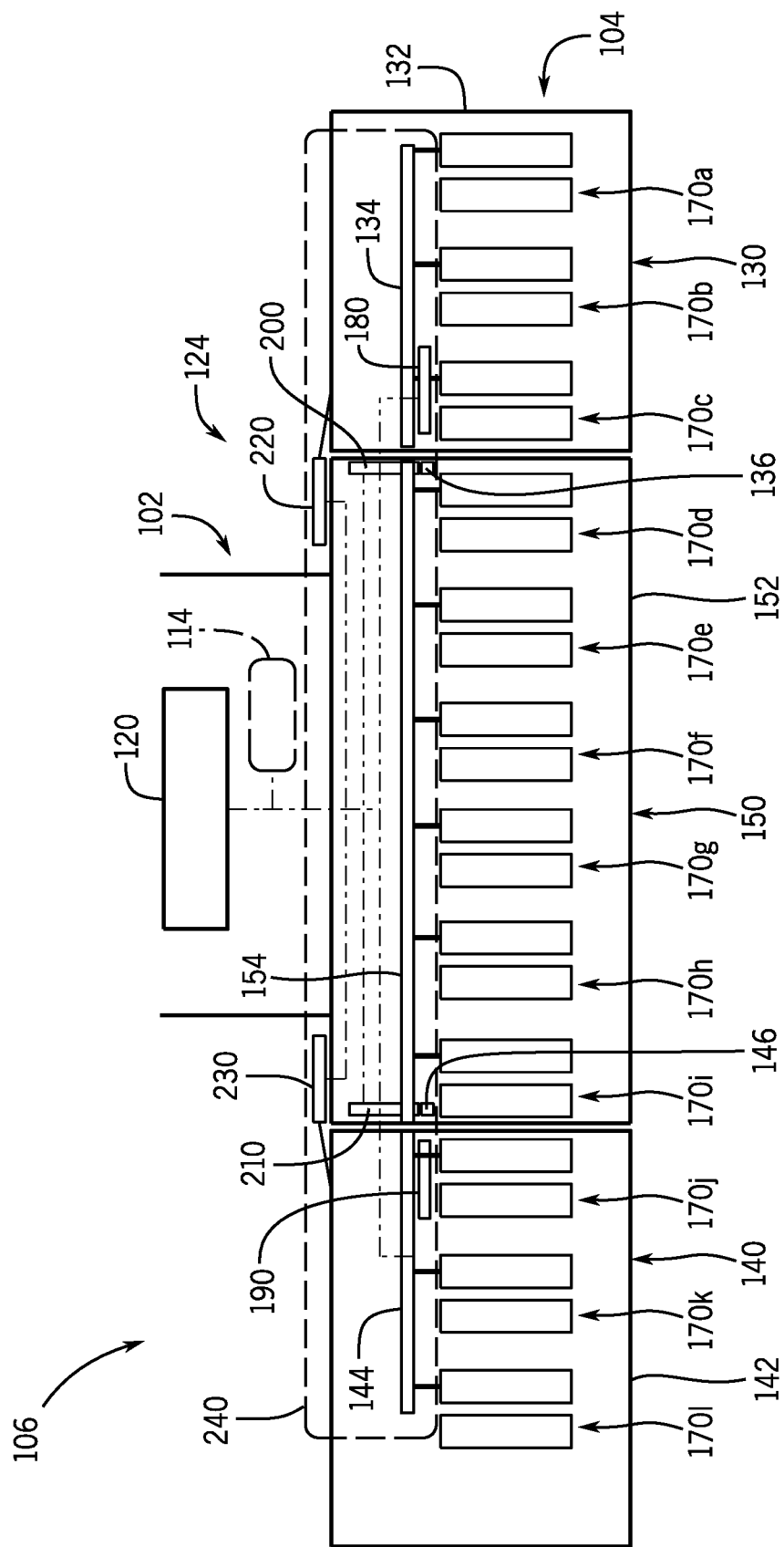
FIG. 4 is a schematic view of a corn head adjustment system of the agricultural machine of FIG. 1 according to an example.
Figure 5:
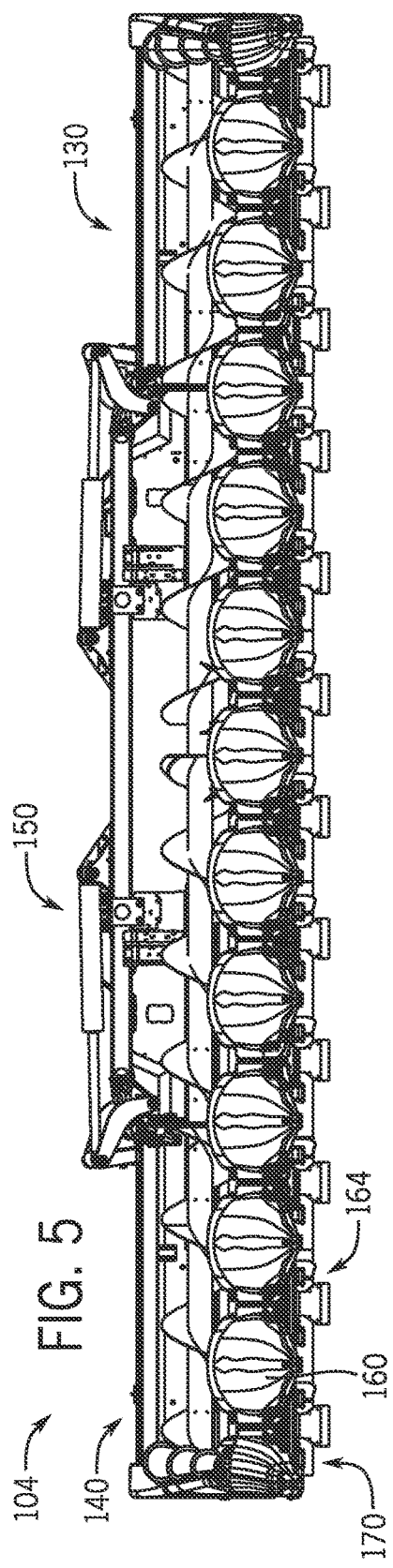
FIG. 5 is a front view of the corn head according to an example.
Figure 6:
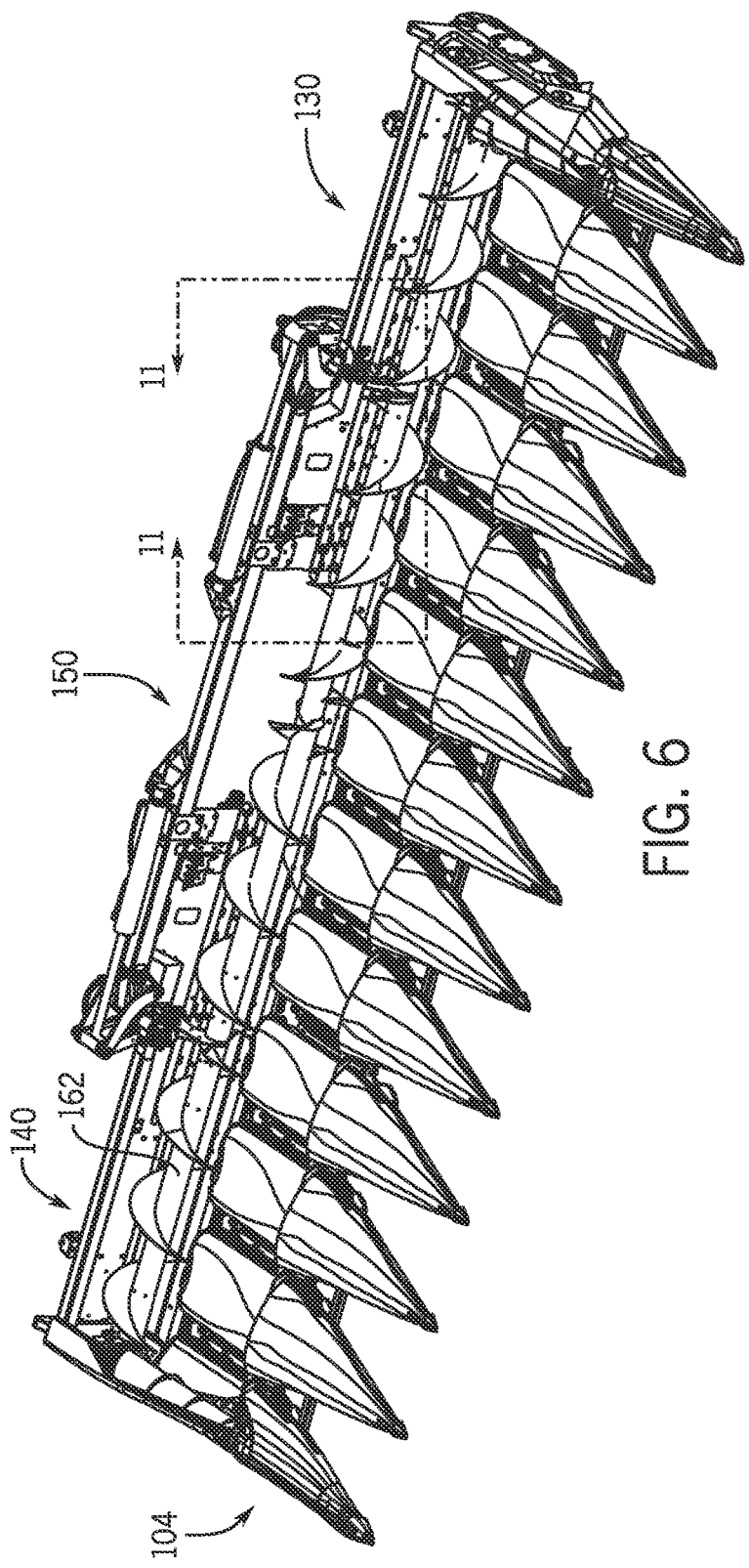
FIG. 6 is a top side view of the corn head according to an example.
Figure 7:
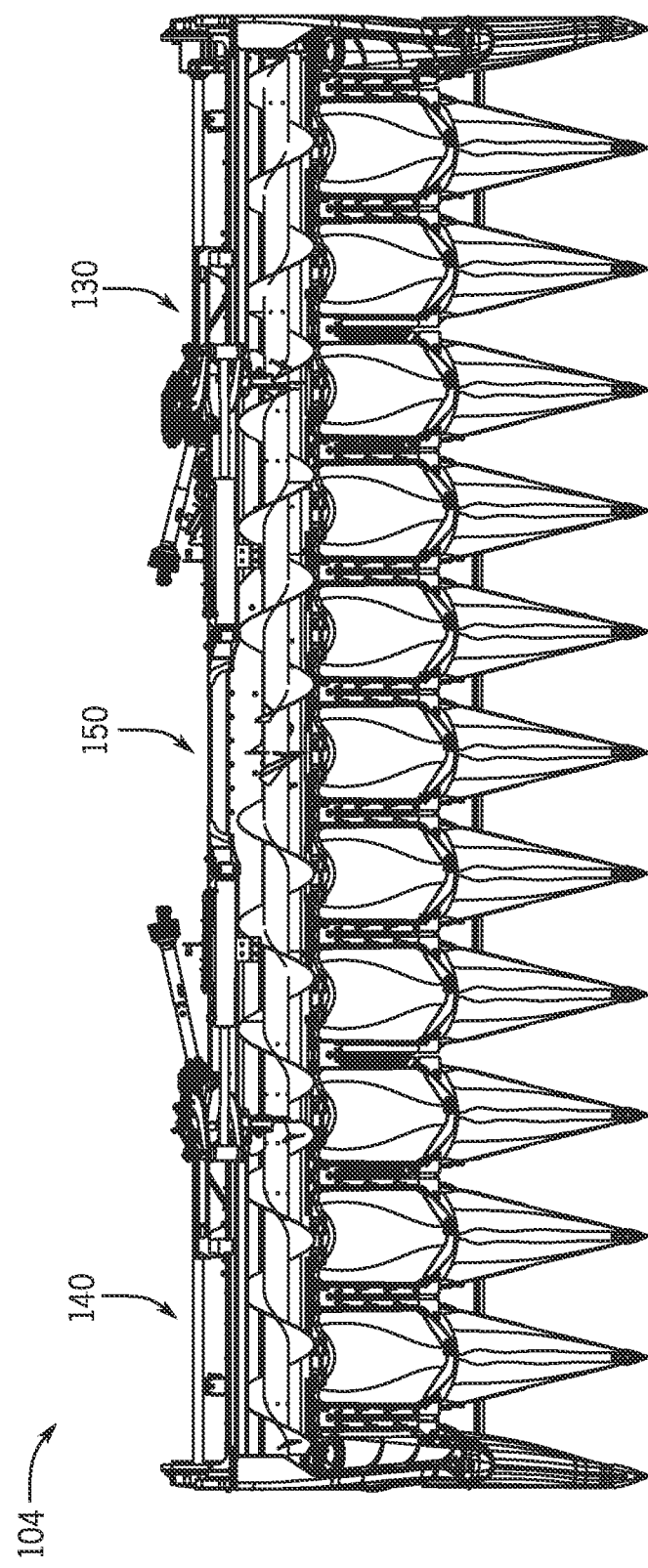
FIG. 7 is a top view of the corn head according to an example.
Figure 8:
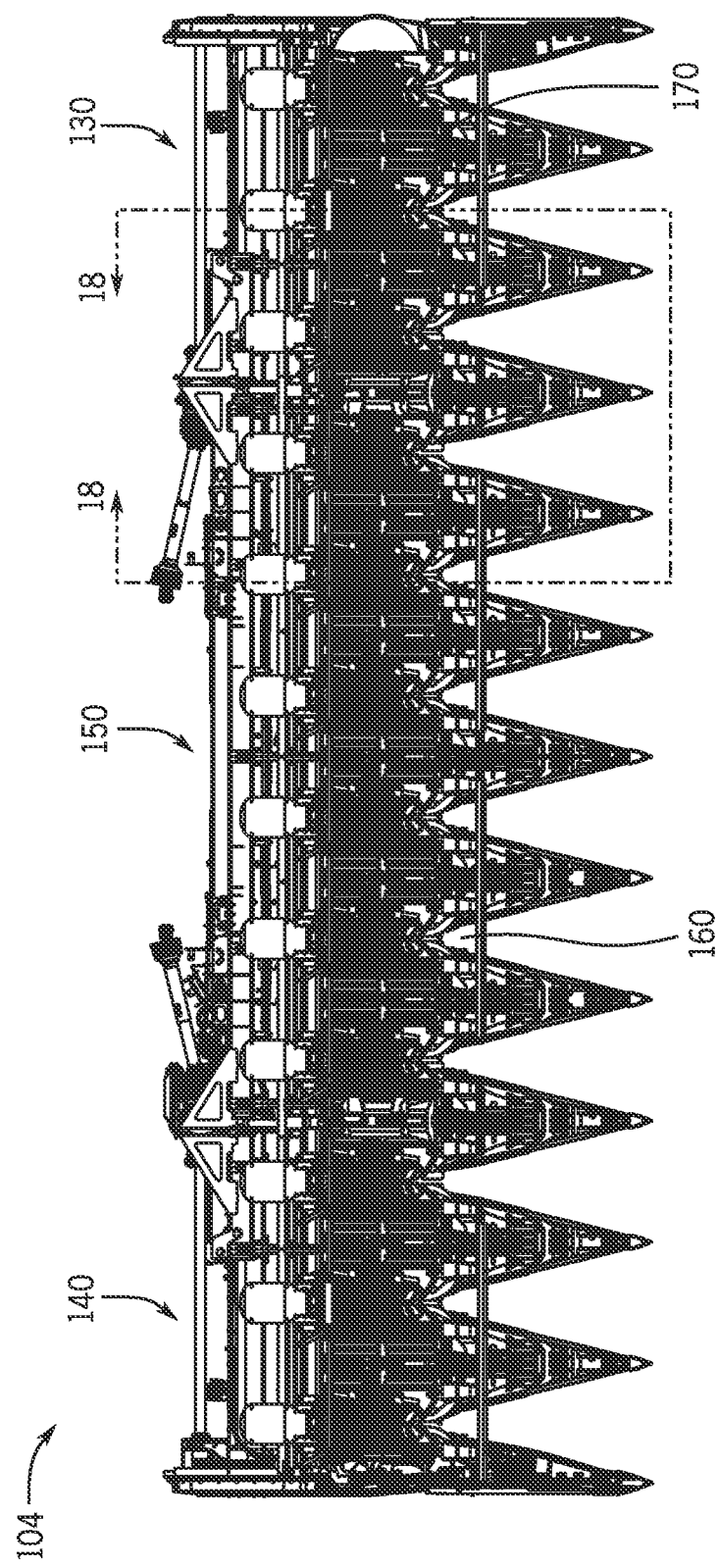
FIG. 8 is a bottom view of the corn head according to an example.

Reference is now made to FIG. 4, which is a schematic representation of the head adjustment system 106 on the vehicle 102 and/or corn head 104. As noted above, the corn head adjustment system 106 may be considered to include the controller 120, at least segments of the vehicle hydraulics 114, and various components of the corn head 104, particularly actuators and hydraulics of the corn head 104. As also introduced above, the corn head 104 is formed by left and right wing segments 130, 140 on either side of center segment 150. In turn, the wing and center segments 130, 140, 150 are formed by respective frames 132, 142, 152 on which various elements may be supported.

As discussed in greater detail below, the corn head 104 includes a number of deck plates 170, depicted as a series of deck plate sets 170a-170l in FIG. 4. Each deck plate set 170a-170l defines a spacing that admits the corn stalks for further processing and removal of the corn ears. In particular, each deck plate set 170a-170l includes a stationary plate and an adjustable plate mounted on a rod 134, 144, 154, laterally repositionable to modify the spacings. In one example, the deck plate rods 134, 144, 154 include a left deck plate rod 134 positioned on the left wing frame 132, a right deck plate rod 144 positioned on the right wing frame 142, and a center deck plate rod 154 positioned on the center frame 152. During typical operation, the left and right wing deck plate rods 134, 144 abut the ends of the center deck plate rod 154. The center deck plate rod 154 is configured to be laterally repositionable by the mechanical force of repositioning the left and right wing deck plate rods 134, 144.

Further, the corn head 104 includes lock assemblies 136, 146 mounted on the ends of the center frame 152. The lock assemblies 136, 146 may also have a portion mounted on the wing frames 132, 142 that enable the wing frames 132, 142 to be locked relative to the center frame 152, as discussed in greater detail below.

Generally, the head adjustment system 106 operates to modify the position of one or more components of the corn head 104 on the vehicle 102. In particular, the controller 120 operates to command actuators 180, 190, 200, 210, 220, 230 of the head adjustment system 106 to reposition aspects of the corn head 104. In particular, the head adjustment system 106 actuates the deck plate actuators 180, 190, the lock actuators 200, 210, and the fold actuators 220, 230 in order to respectively modify the deck plates 170, the lock assemblies 136, 146, and the wing segments 130, 140, which may be implemented individually and/or in combination with one another. Such commands may be implemented by vehicle hydraulics 114 and head hydraulics 240. Generally, the hydraulics 114, 240 refer to the combination of conduits, passages, valves, tanks, pumps, electrical and fluid connections, and the like that operate to implement the functions described herein. More specific example arrangements of the hydraulics 114, 240 are provided below.

Regarding the fold actuators 220, 230, the head adjustment system 106 includes a first (or left) fold actuator 220 mounted on the left wing frame 132 and further coupled to the center frame 152 and a second (or right) wing fold actuator 230 mounted on the right wing frame 142 and further coupled to the center frame 152. As introduced above, the fold actuators 220, 230 have first (or extended) positions to unfold the wing segments 130, 140 relative to the center segment 150, and the fold actuators 220, 230 have second (or retracted) positions to lock the wing segments 130, 140 relative to the center segment 150.

Regarding the deck plate actuators 180, 190, the head adjustment system 106 may modify the spacing of deck plate sets 170a-170l. Generally, each deck plate set 170a-170l (collectively, "deck plates" 170) includes a stationary deck plate and an adjustable deck plate that may be repositioned by the head adjustment system 106 to modify the spacings into the associated corn processing elements, as described below. As schematically shown and introduced above, the head adjustment system 106 may be considered to include wing deck plate rod 134, 144 supported in each wing frame 132 and center deck plate rod 154 supported in the center frame 152. During operation and when the wing segments 130, 140 are in the unfolded position, the wing deck plate rods 134, 144 abut the center deck plate rod 154. Each adjustable deck plate of the deck plate sets 170a-170l may be fixed to one of the wing deck plate rods 134, 144 or the center deck plate rod 154. In the depicted example, the adjustable deck plates of deck plate sets 170a-170c are coupled to the left wing deck plate rod 134; the adjustable deck plates of deck plate sets 170d-170i are coupled to the center deck plate rod 154; and the adjustable deck plates of deck plate sets 170j-170l are coupled to the right wing deck plate rod 144.

The head adjustment system 106 further includes deck plate actuators 180, 190. A first (or left) deck plate actuator 180 is coupled to the left wing frame 132 and is further coupled to the left wing deck plate rod 134, and a second (or right) deck plate actuator 190 is coupled to the right wing frame 142 and is further coupled to the right wing deck plate rod 144. Upon activation, the deck plate actuators 180, 190 may laterally adjust the deck plate rods 134, 144. As such, the deck plate actuators 180, 190 may move both the rods 134, 144 away from the center deck plate rod 154 (e.g., in opposite, outward directions) or towards the center deck plate rod 154 (e.g., in the opposite, inward directions); or the deck plate actuators 180, 190 may cooperate to move both the rods 134, 144 in the same direction to push the center deck plate rod 154 in the actuated direction in order to collectively increase or decrease the spacings of the deck plate sets 170a-170l. In this example, moving the rods 134, 144, 154 toward the left side wing segment 130 (e.g., to the right in FIG. 4) functions to increase the spacings of the deck plate sets 170a-170l, and moving the rods 134, 144, 154 toward the right side wing segment 140 (e.g., to the left in FIG. 4) functions to decrease the spacings of the deck plate sets 170a-170l.

Regarding the lock actuators 200, 210, the head adjustment system 106 may further include a first (or left) lock assembly 136 that functions to secure and align the left wing segment 130 to the center segment 150 and a second (or right) lock assembly 146 that functions to secure and align the right wing segment 140 to the center segment 150. Additional details regarding the lock assemblies 136, 146 are provided below. In brief, the lock actuators 200, 210 have first (or extended) positions to lock the lock assemblies 136, 146 (e.g., to secure the respective wing segment 130, 140 to the center segment 150), and the lock actuators 200, 210 have second (or retracted) positions to unlock the lock assemblies 136, 146 (e.g., to release the respective wing segment 130, 140 relative to the center segment 150). Additional information regarding the hydraulics 114, 124 that actuate actuators 180, 190, 200, 210, 220, 230 of the corn head adjustment system 106 is provided below after a discussion of the mechanical structure and elements of the corn head 104 depicted in FIG. 5-19.

The views of FIGS. 5-8 depict various views of the corn head 104, including the left wing segment 130, the right wing segment 140, and the center segment 150. As noted above, the corn head includes an array of processing elements 164 and deck plates 170 separated and partially housed by covers 160 such that corn may be separated from the stalk and transported to the vehicle 102 by an auger 162. In this example, the corn head 104 may be able to process twelve (12) rows of corn, although other examples may be able to accommodate other numbers of rows. Although not discussed in great detail, the processing elements 164 that are used to gather, pinch, chop, and discard the corn stalk and to direct the corn ears to the feederhouse of the vehicle 102 (FIG. 1) may include intermeshing stalk rolls, chopping or knife elements, gathering chains, augers, guards, wear plates, and/or various drive components.

Figure 9:
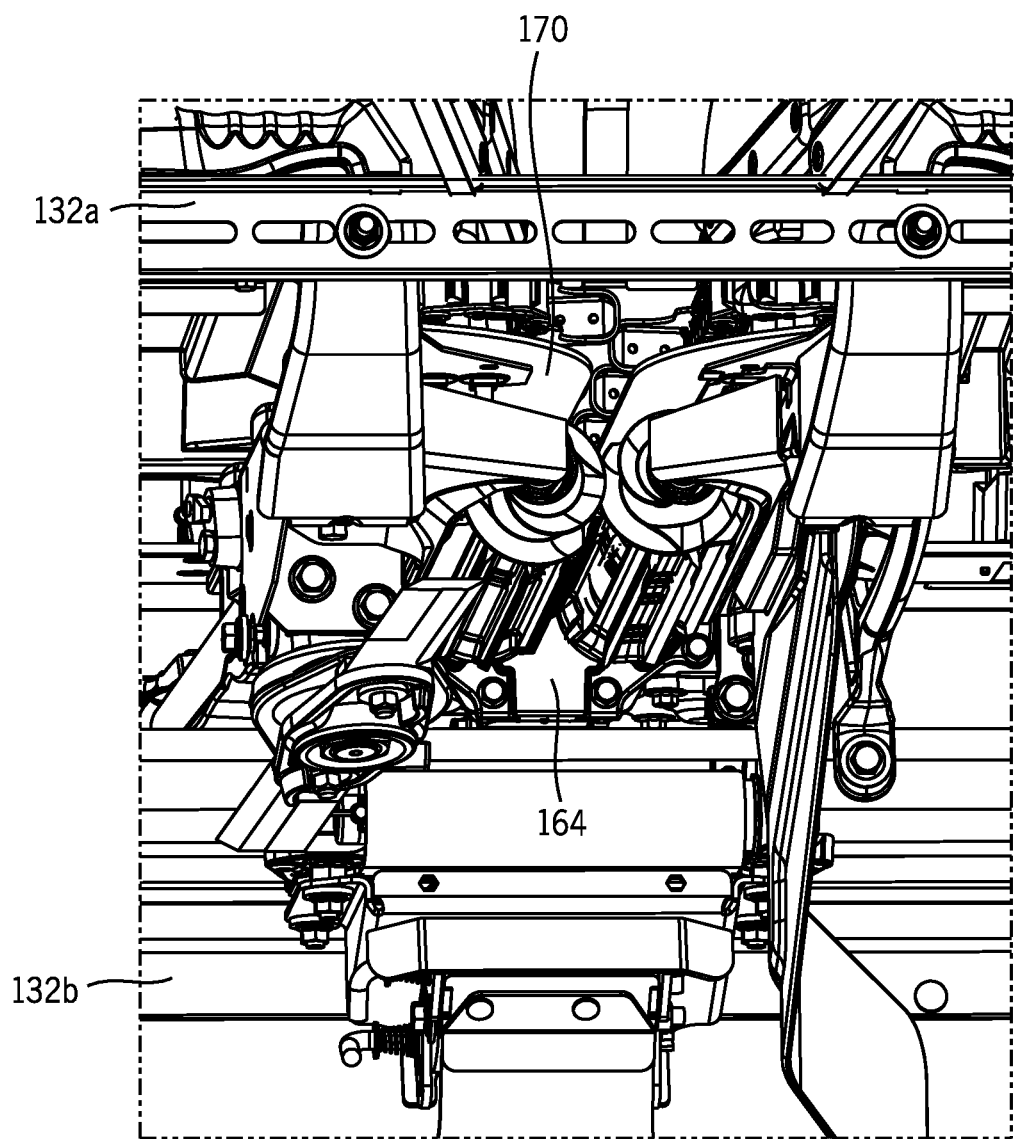
FIG. 9 is a bottom rear view of a portion of the corn head according to an example.
Figure 10:
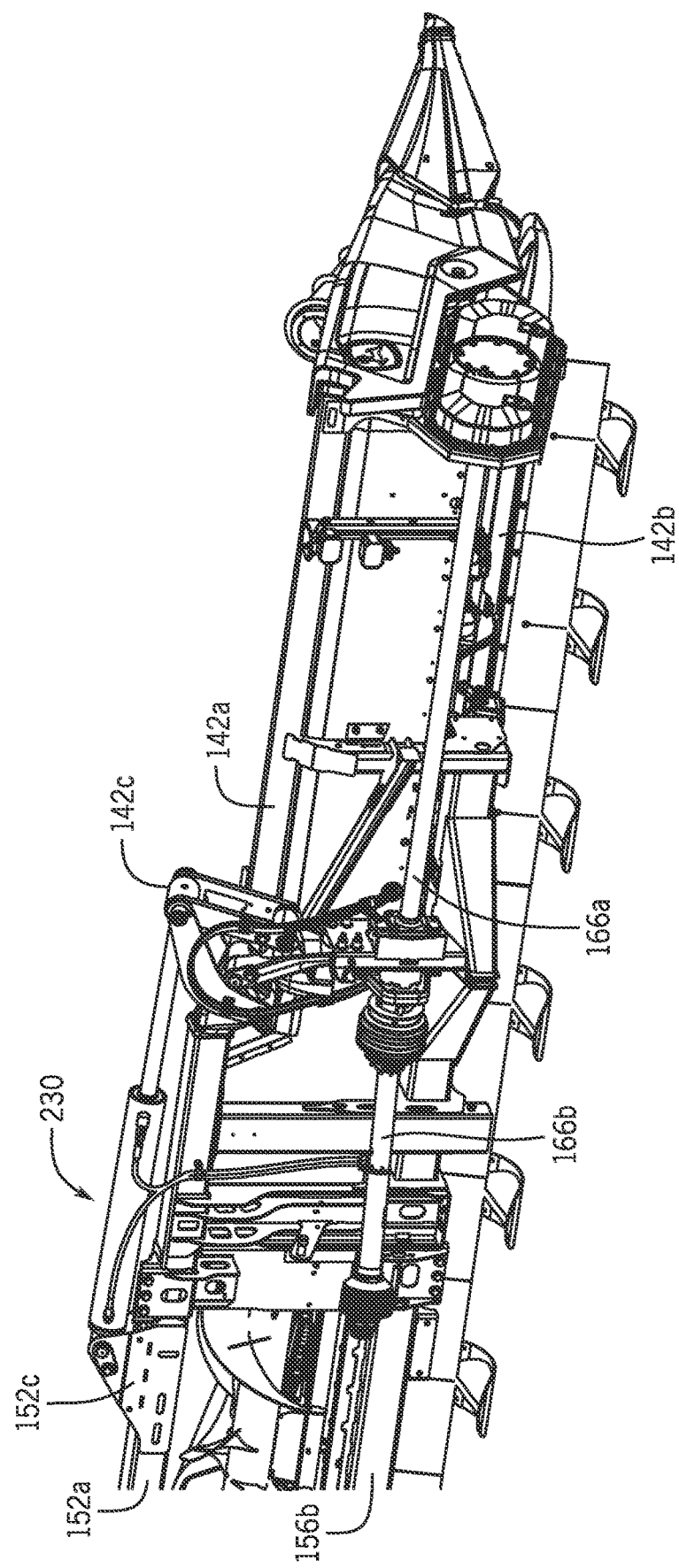
FIG. 10 is a rear view of a portion of the corn head according to an example.
Figure 11:
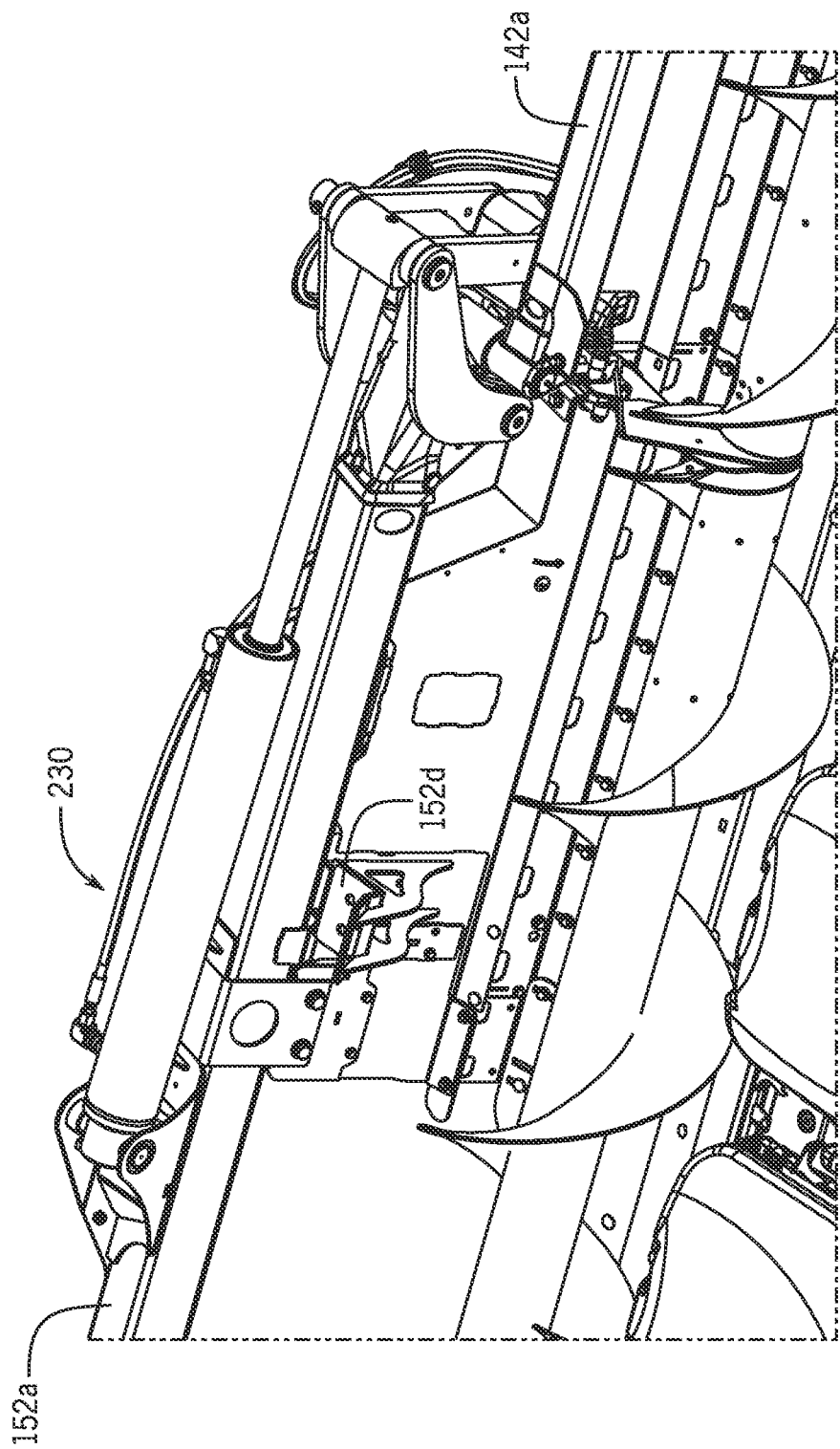
FIG. 11 is a top front view of a portion of the corn head along line 11-11 of FIG. 6 according to an example.
Figure 12:
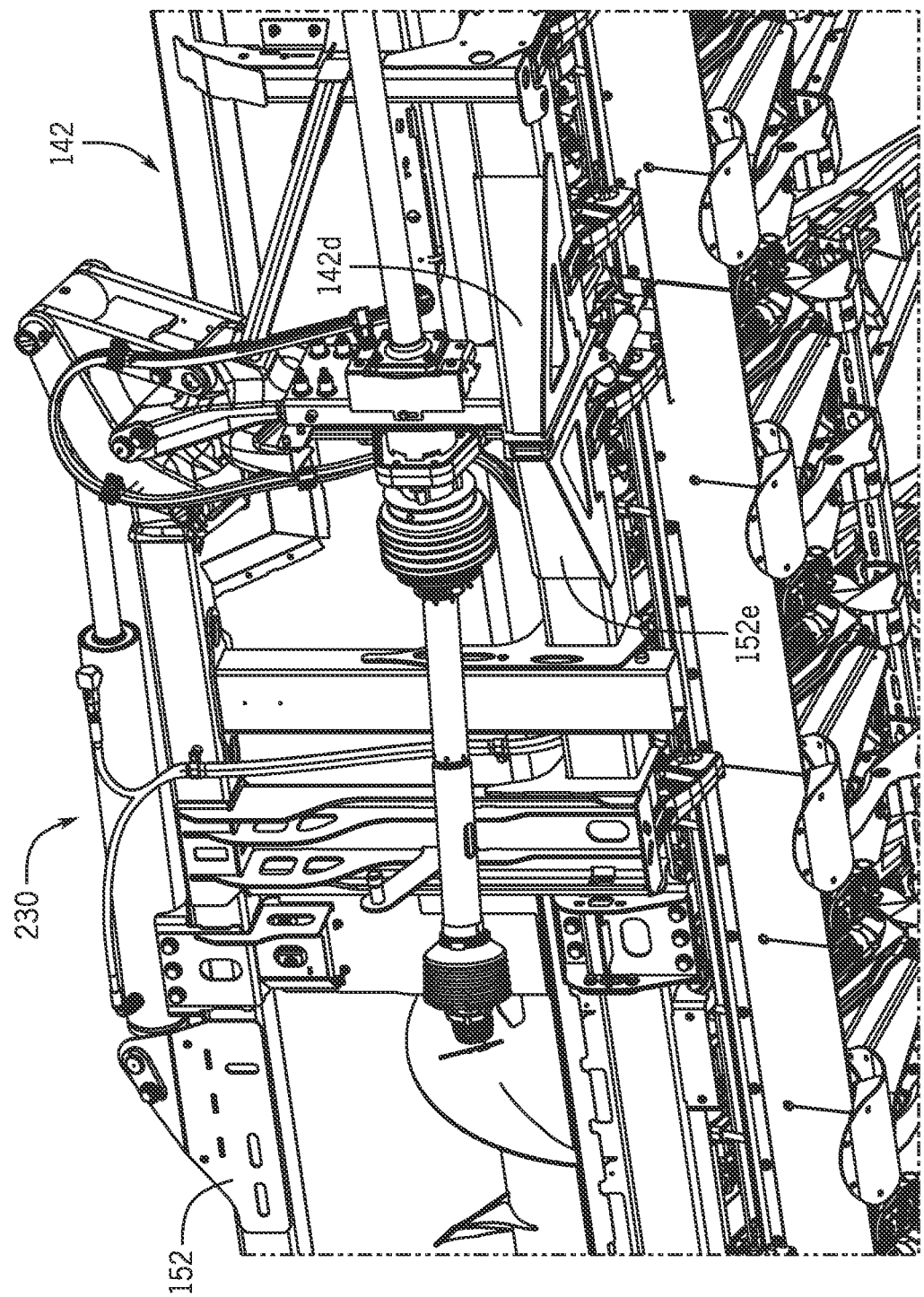
FIG. 12 is a bottom rear view of a portion of the corn head according to an example.
Figure 13:
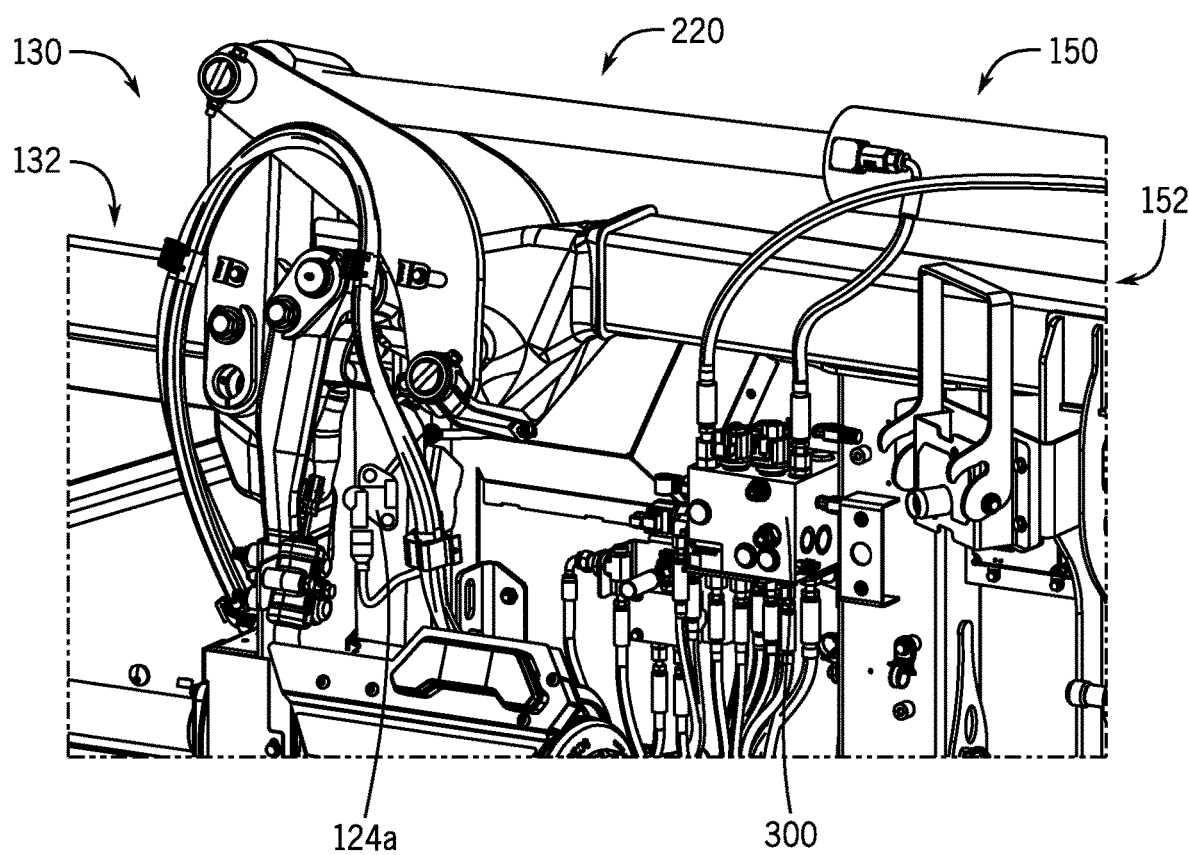
FIG. 13 is a top rear view of a portion of the corn head according to an example.
Figure 14:
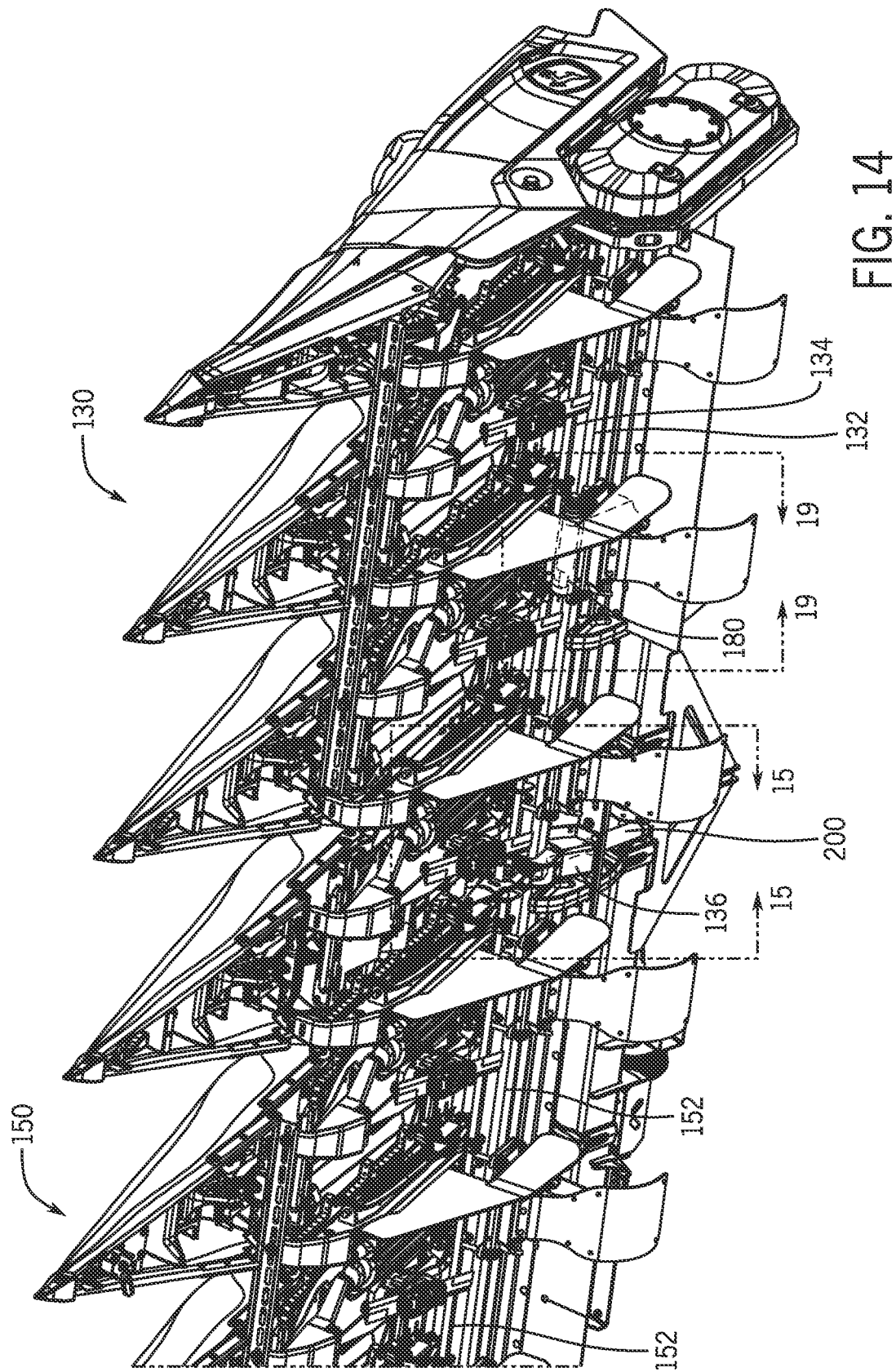
FIG. 14 is a front underside view of a portion of the corn head according to an example.
Figure 15:
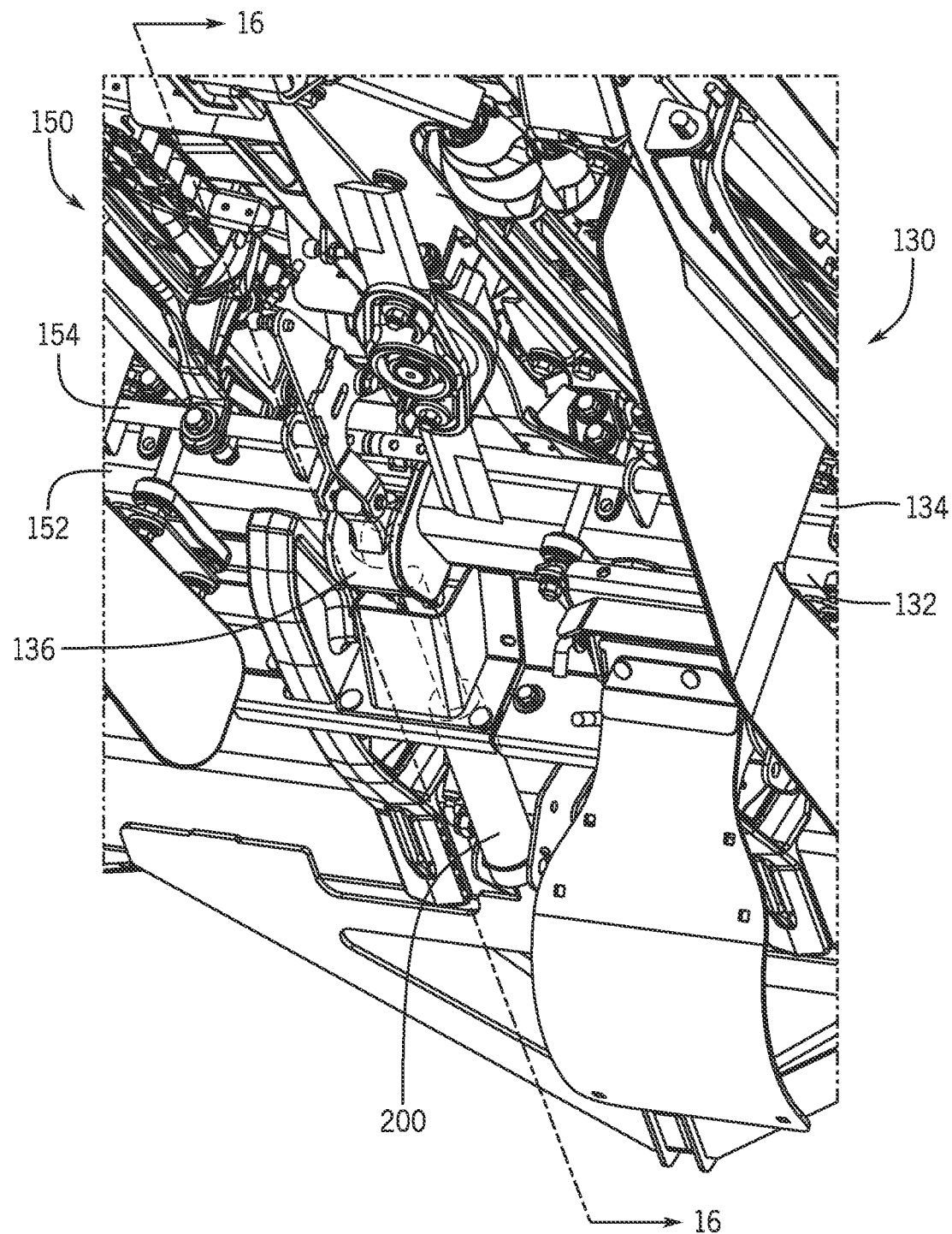
FIG. 15 is a front underside view of a portion of the corn head representing section 15-15 of FIG. 14 according to an example.
Figure 16:
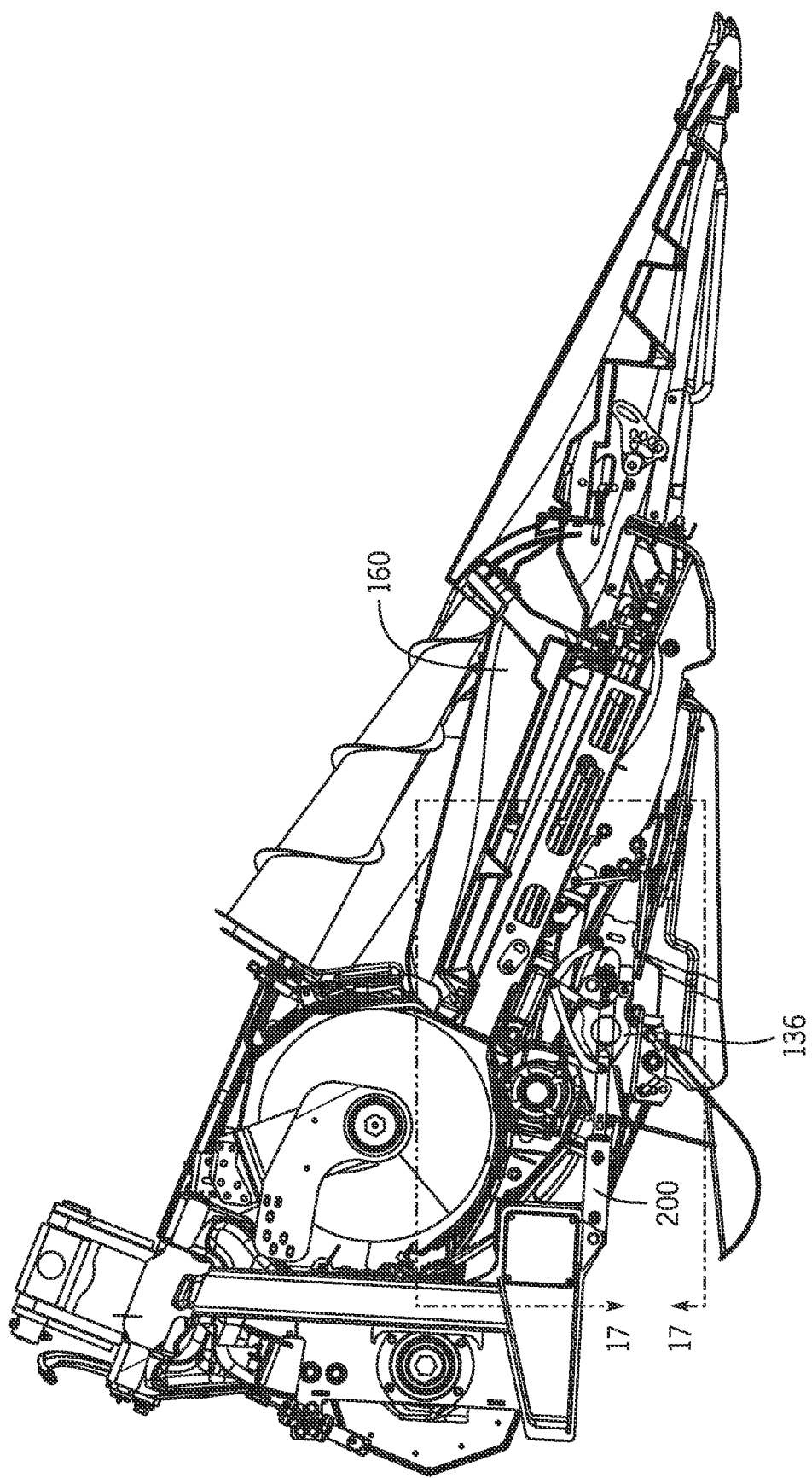
FIG. 16 is a cross-sectional view of the corn head through line 16-16 of FIG. 15 according to an example.
Figure 17:
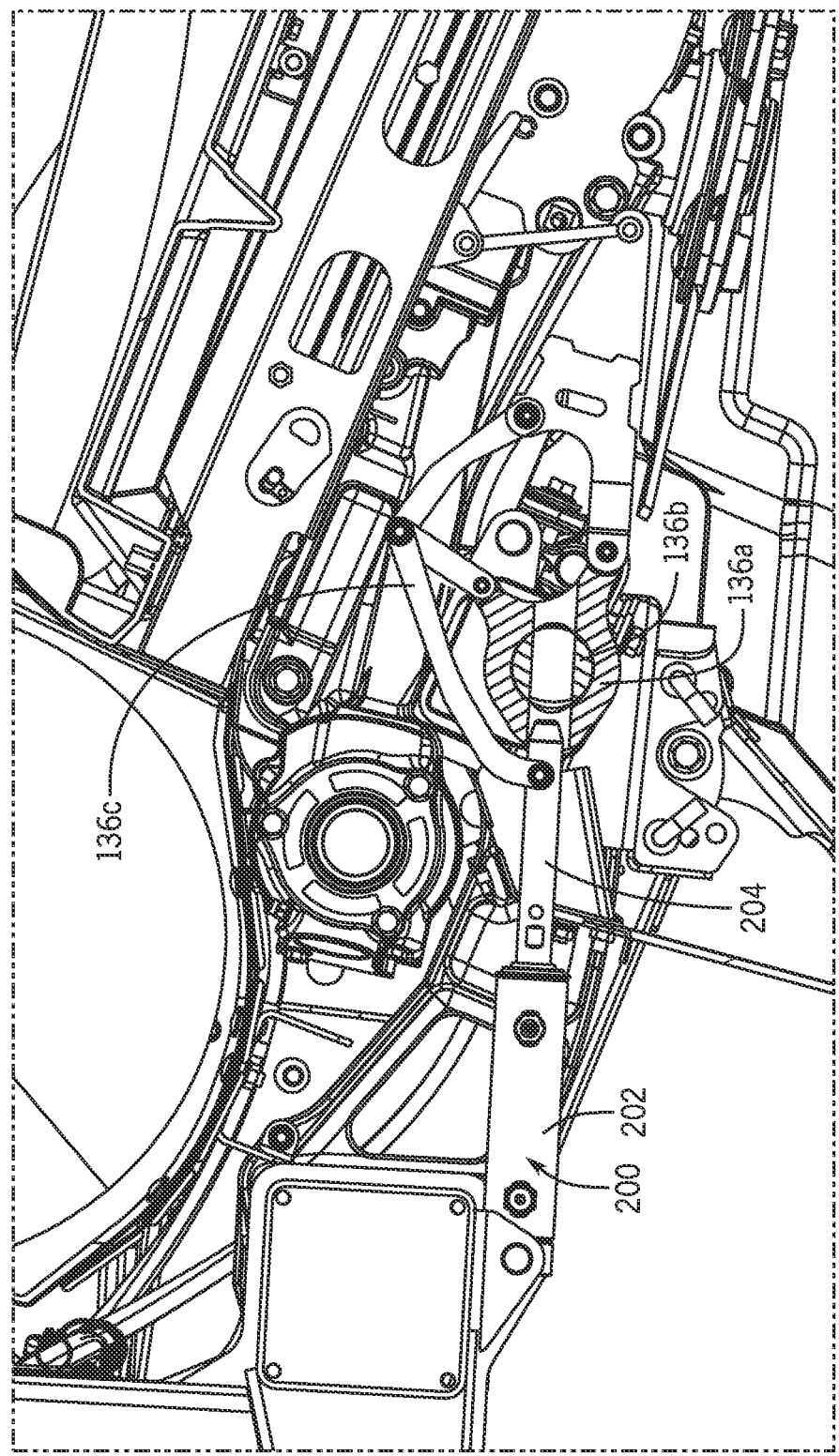
FIG. 17 is a cross-sectional view of the corn head through line 17-17 of FIG. 16 according to an example.
Figure 18:
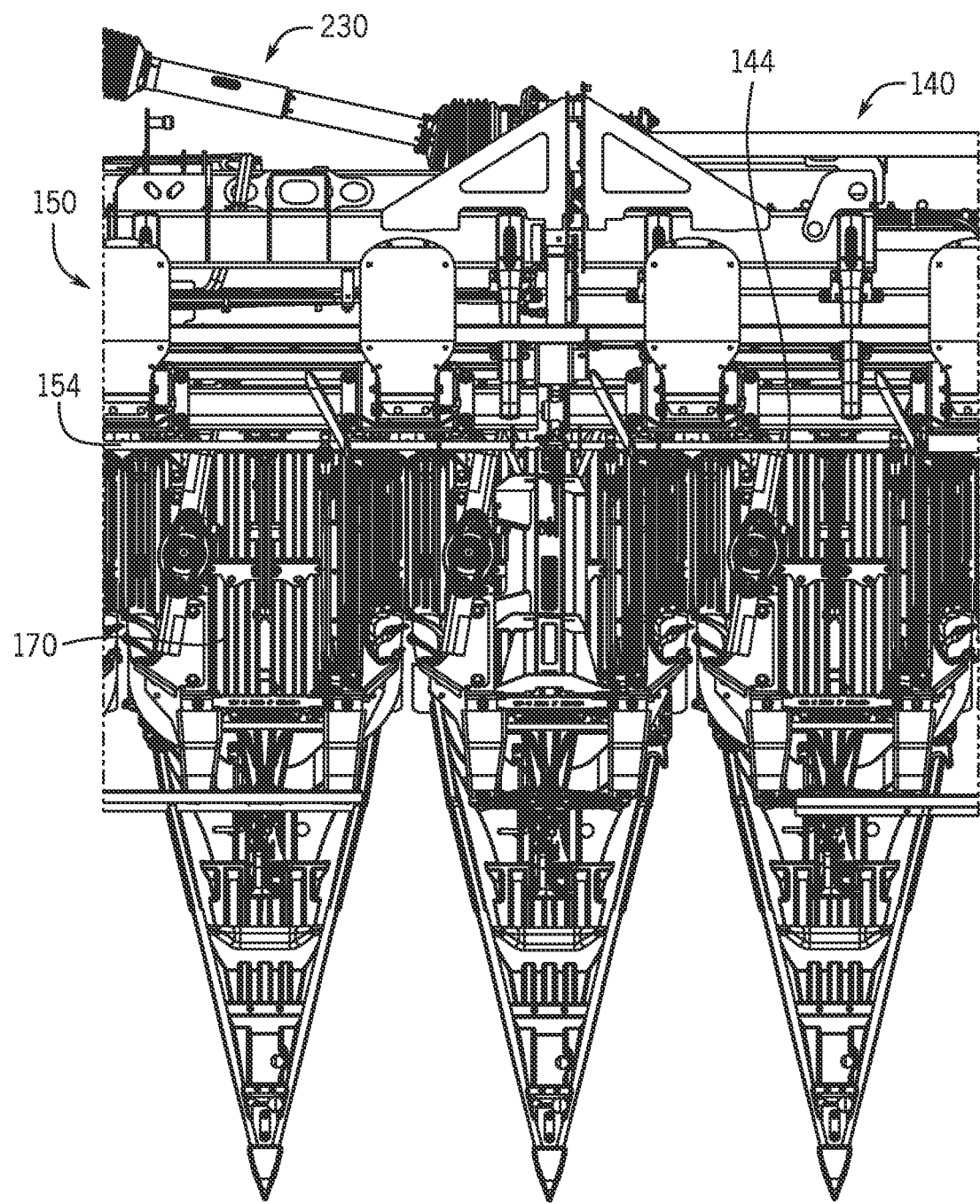
FIG. 18 is a partial underside view of the corn head along line 18-18 of FIG. 8 according to an example.
Figure 19:
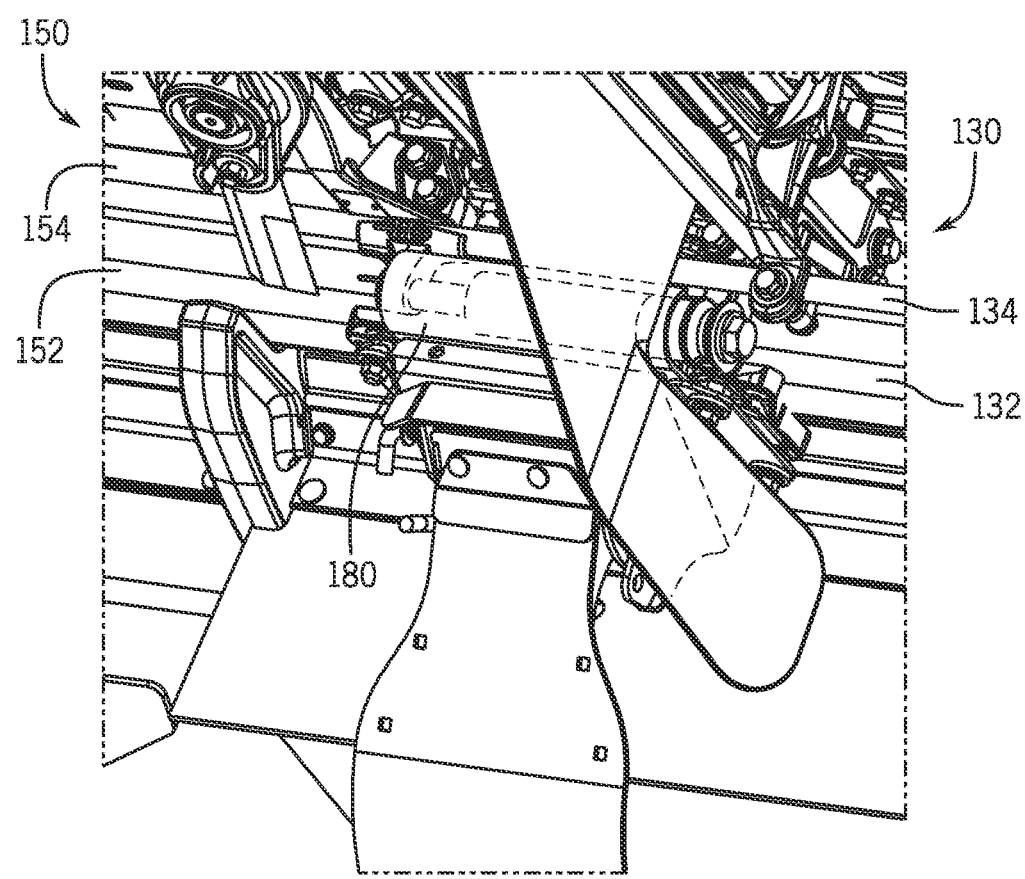
FIG. 19 is a partial underside view of the corn head along line 19-19 of FIG. 14 according to an example.

Further, FIGS. 9-19 depict additional views of the corn head 104, particularly elements of the corn head adjustment system 106. Generally, FIG. 9 is a bottom rear view of a portion of the corn head 104; FIG. 10 is a rear view of a portion of the corn head 104; FIG. 11 is a top front view of a portion of the corn head 104 along line 11-11 of FIG. 6; FIG. 12 is a bottom rear view of a portion of the corn head 104; FIG. 13 is a top rear view of a portion of the corn head 104; FIG. 14 is a front underside view of a portion of the corn head 104; FIG. 15 is a front underside view of a portion of the corn head 104 representing section 15-15 of FIG. 14; FIG. 16 is a cross-sectional view of the corn head 104 through line 16-16 of FIG. 15; FIG. 17 is a cross-sectional view of the corn head 104 through line 17-17 of FIG. 16; FIG. 18 is a partial underside view of the corn head 104 along line 18-18 of FIG. 8; and FIG. 19 is a partial underside view of the corn head 104 along line 19-19 of FIG. 14.

Initially reference is made to FIG. 9, which better depicts the processing elements 164 mounted on in between the left wing segment frame elements 132a, 132b. The view of FIG. 9 additional provides an example of a set of deck plates 170 that set the spacing for processing the corn.

Now referring to FIG. 10 and as introduced above, the lift actuator 230 includes a cylinder mounted by a bracket 152c on a center frame segment element 152a and a rod mounted by a bracket 142c on a right frame segment element 142a. As a result of this arrangement, retraction of the lift actuator 230 operates to fold the wing frame 142 relative to the center frame 152. The left wing segment 130 and lift actuator 220 are similarly arrangement. The view of FIG. 10 further depicts drive elements 166a, 166b for driving the processing elements 164.

The views of FIGS. 11 and 12 are similar to that of FIG. 10, and particularly depict a fold stop 152d (FIG. 11) that supports the right wing segment 140 on the center segment 150 and unfold stops 142d, 152e that abut one another when unfolded. The force on stops 142d, 152d, 152e may be mitigated or addressed by the force relief arrangements of the corn head hydraulics discussed below.

Now referring to FIG. 13, the lift actuator 220 extends between the left wing frame 132 and the center frame 152 to fold and unfold the left wing segment 130 relative to the center segment 150. The view additionally depicts a sensor 124a mounted on the center frame 152 that operates to determine the angle of the wing frame 132 relative to the center frame 152 in order to actuate the force relief arrangements of the of the corn head hydraulics discussed below. The view of FIG. 13 also depicts a valve block 300 that forms part of the corn head hydraulics discussed in greater detail below.

The view of FIG. 14 is a front underside view of a portion of the corn head 104 and depicts various elements discussed in greater detail below. In particular, the view of FIG. 14 depicts the deck plate actuator 180 that operates to reposition the deck plate rod 134, and by abutment, the deck plate rod 154 of the center segment 150. As shown, the deck plate actuator 180 is mounted on the left segment frame 132 to cooperate with a deck plate actuator 190 mounted on the right wing frame 142 (not shown in FIG. 14) to reposition the deck plates 170. Additionally, the lock assembly 136 is mounted on the center frame 152 and cooperates with the lock actuator 200 in order to lock the left wing segment 130 relative to the center segment 150. As discussed below, the lock actuator 200 is extended to lock the lock assembly 136 and retracted to unlock the lock assembly 136. A similar lock assembly 136 and lock actuator 210 are provided on the other side of the center frame 152 to lock the right wing segment 140 to the center segment 150.

The views of FIGS. 15-18 provide additional views of the lock assembly 136 and lock actuator 200. The cylinder 202 of the lock actuator 200 is mounted on the center frame 152 and the rod 204 of the lock actuator 200 is positioned to extend into the lock assembly 136. As best shown in FIGS. 15 and 16, an outer portion 136a of the lock assembly 136 is mounted on the center frame 152 and an inner portion 136b of the lock assembly 136 is mounted on the left wing frame 132. The inner portion 136b is partially housed within the outer portion 136a and each has generally aligned slots. When the lock actuator 200 is retracted, the portions 136a, 136b may move relative to one another; but when the lock actuator 200 is extended through the slots into the portions 136a, 136b, the portions 136a, 136b are locked relative to one another.

Additionally, an arm bracket 136c is mounted to the rod 204 of the lock actuator 200, to the center frame 152, and to a cover 160. As a result, as the rod 204 of the lock actuator 200 is extended, the cover 160 is maintained in a default position over the processing elements 164. However, as the rod 204 of the lock actuator 200 is retracted, the cover 160 is pivoted slightly (as best shown in FIG. 2) by the arrangement of the arm bracket 136c to enable the cover to accommodate the folding process.

Further, the view of FIG. 18 depicts an underside of the corn head 104 and particularly depicts portions of the deck plates 170, the center deck plate rod 154, the right wing deck plate rod 144, and the right wing fold actuator 230. As discussed below, the deck plate rods 144, 154 operate to reposition the spacing of the deck plates 170 and to retract the right wing deck plate rod 144 relative to the center deck plate rod 154 to enable folding of the right wing segment 140 relative to the center segment 150. Similarly, the view of FIG. 19 depicts an underside of the corn head 104 and particularly depicts a closer view of deck plate actuator 180 that repositions the left deck plate rod 134 for retraction and for repositioning of the deck plates 170.

Figure 20:
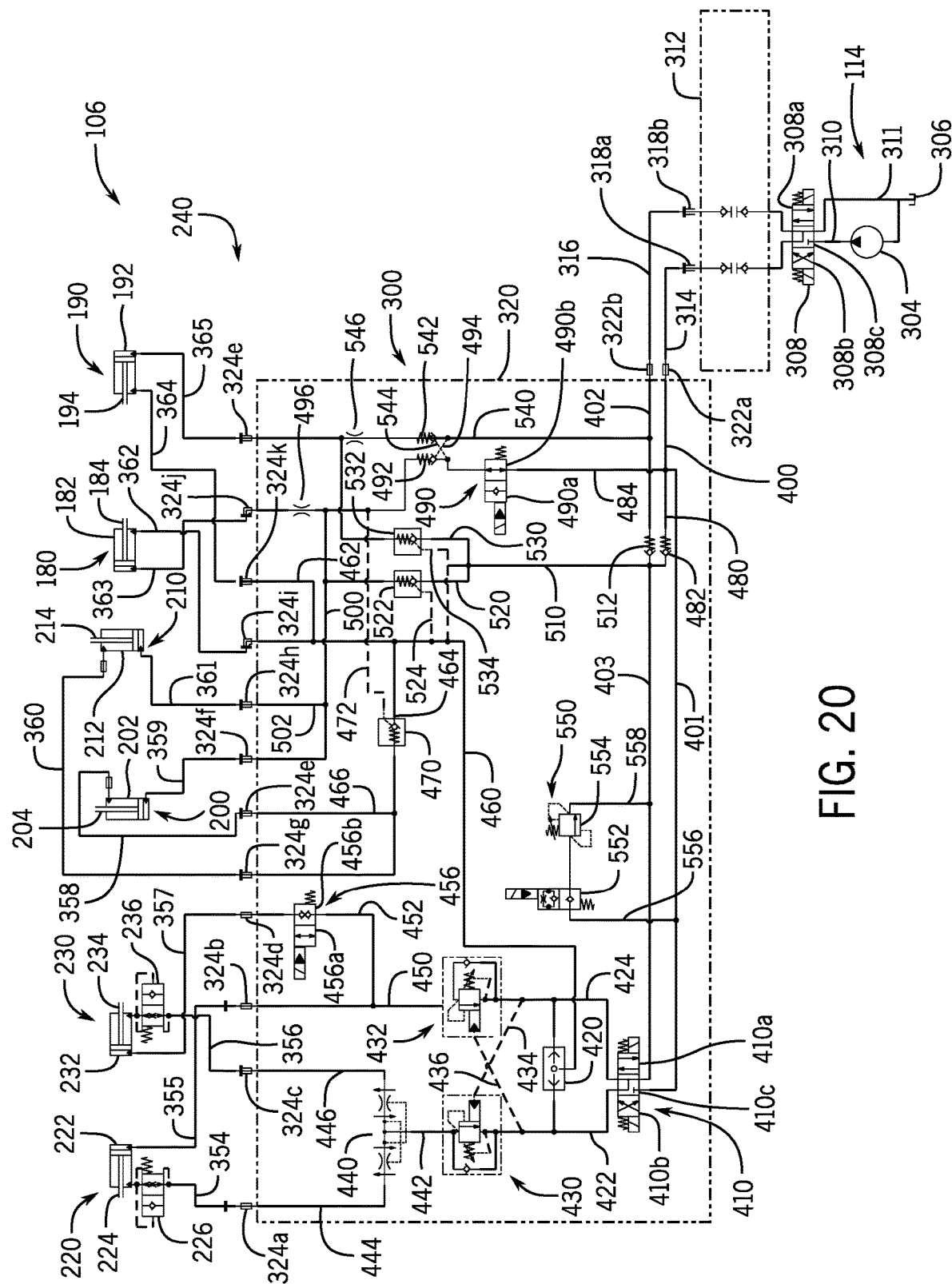
FIG. 20 is a schematic view of the corn head adjustment system of the agricultural machine of FIG. 1 according to a first example.

FIG. 20 is a schematic view of the corn head adjustment system 106 of the agricultural machine 100 of FIG. 1 according to a first embodiment. As noted above, the corn head adjustment system 106 includes vehicle hydraulics 114 and head hydraulics 240 that operate the actuators 180, 190, 200, 210, 220, 230. In this example, a portion of the head hydraulics 240 is embodied within a corn head valve block 300 that may be mounted on the center segment 150 of the corn head 104 that fluidly communicates with the vehicle hydraulics 114 and the actuators 180, 190, 200, 210, 220, 230. The valve block 300 may be considered a unit or module that houses various hydraulic components for selective distribution.

As shown, the vehicle hydraulics 114 may include a pump 304, a drain or source 306, and a vehicle directional valve 308. Upon activation, the pump 304 pressurizes the fluid from the drain 306, and the vehicle directional valve 308 facilitates the distribution in and out of the vehicle hydraulics 114 via a supply line 310 and a drain line 311. The vehicle directional valve 308 may be solenoid valve commanded by signals from the controller 120 into a first position 308a, a second position 308b, and a third (or default) position 308c. The combine head coupling element 312 couples the vehicle hydraulics 114 to the head hydraulics 240. In this example, first and second lines 314, 316 extend from ports 318a, 318b between the vehicle hydraulics 114 and the head hydraulics 240, particularly to the valve block 300.

In one example, the valve block 300 includes a body 320 (schematically shown) with the two primary ports 322a, 322b and a number of actuator ports 324a-324l such that the components of the valve block 300 may distribute fluid flow between the vehicle hydraulics 114 and the actuator 180, 190, 200, 210, 220, 230.

As introduced above, the wing fold actuator set includes the left wing fold actuator 220 and right wing fold actuator 230. The left wing fold actuator 220 includes a cylinder 222 and a rod 224 partially arranged within the cylinder 222 with a piston head defining chambers such that fluid flowing into a retraction-side chamber of the cylinder 222 via line 354 operates to retract the rod 224 and fluid flowing into an extension-side chamber of the cylinder 222 via line 355 operates to extend the rod 224. Similarly, right wing fold actuator 230 includes a cylinder 232 and a rod 234 partially arranged within the cylinder 232 with a piston head defining chambers such that fluid flowing into a retraction-side chamber of the cylinder 232 via line 356 operates to retract the rod 234 and fluid flowing into an extension-side chamber of the cylinder 232 via line 357 operates to extend the rod 234. As such, the fold actuators 220, 230 are dual-acting actuators that may be actively commanded in each direction. As shown, lines 354-357 are respectively coupled to ports 324a-324d. Generally, as introduced above, retraction of the rods 224, 234 of the wing fold actuators 220, 230 operates to fold up the wing segments 130, 140 relative to the center segment 150; and extension of the rods 224, 234 of the wing fold actuators 220, 230 operates to unfold the wing segments 130, 140 relative to the center segment 150.

In one example, each wing fold actuator 220, 230 may be associated with a "velocity fuse" valve 226, 236. The velocity fuse valves 226, 236 generally enable flow of fluid through the associated lines 354, 356; however, upon identifying a predetermined rate of fluid flow out of the respective actuator 220, 230, the respective velocity fuse valve 226, 236 activates to block the flow of fluid through the line 354, 356. In effect, velocity fuse valves 226, 236 operate as safety features to prevent the wing segments 130, 140 from falling if a line is severed and fluidly flows too quickly out of the actuators 220, 230. The velocity fuse valves 226, 236 may have any suitable activation setting, such as 8 gallons per minute.

As also introduced above, the wing lock actuator set includes the left wing lock actuator 200 and the right wing lock actuator 210. The left wing lock actuator 200 includes a cylinder 202 and a rod 204 partially arranged within the cylinder 202 with a piston head defining chambers such that fluid flowing into a retraction-side chamber via line 358 operates to retract the rod 204 and fluid flowing into an extension-side chamber of the cylinder 202 via line 359 operates to extend the rod 204. Similarly, the right wing lock actuator 210 includes a cylinder 212 and a rod 214 partially arranged within the cylinder 212 with a piston head defining chambers such that fluid flowing into a retraction-side chamber via line 360 operates to retract the rod 214 and fluid flowing into an extension-side chamber of the cylinder 212 via line 361 operates to extend the rod 214. As such, the deck plate actuators 180, 190 are dual-acting actuators that may be actively commanded in each direction. As shown, lines 358-361 are respectively coupled to ports 324e-324h. Generally, as introduced above, retraction of the rods 204, 214 of the wing lock actuators 200, 210 operates to unlock the wing segments 130, 140 relative to the center segment 150; and extension of the rods 204, 214 of the wing lock actuators 200, 210 operates to lock the wing segment 130, 140 relative to the center segment 150.

As further introduced above, the wing deck plate actuator set includes the left wing deck plate actuator 180 and the right deck plate actuator 190. The left wing deck plate actuator 180 includes a cylinder 182 and a rod 184 partially arranged within the cylinder 182 with a piston head defining chambers such that fluid flow into a retraction-side chamber via line 362 operates to retract the rod 184 and fluid flowing into an extension-side chamber of the cylinder 182 via line 363 operates to extend the rod 184. Similarly, the right deck plate actuator 190 includes a cylinder 192 and a rod 194 partially arranged within the cylinder 192 with a piston head defining chambers such that fluid flow into a retraction-side chamber via line 364 operates to retract the rod 194 and fluid flowing into an extension-side chamber of the cylinder 192 via line 365 operates to extend the rod 194. As such, the lock actuators 200, 210 are dual-acting actuators that may be actively commanded in each direction. As shown, lines 362-365 are respectively coupled to ports 324*i*-324*l*. Generally, as introduced above, retraction of the rods 184, 194 of the wing deck plate actuators 180, 190 operates to decouple the wing deck plate rods 134, 144 the wing segments 130, 140 relative to the center segment 150; and extension of the rods 184, 194 of the wing deck plate actuators 180, 190 operates to couple the wing segments 130, 140 relative to the center segment 150. As discussed in greater detail below, the deck plate actuators 180, 190 may also be used to modify the spacing of the deck plate rods 134, 144, 154 (and thus, the spacings of the deck plates 170), as well as to resume or return to a predetermined spacing after unfolding the wing segments 130, 140.

Returning to block 300, in this example, first primary lines 400, 401 and second primary lines 402, 403 extend between primary ports 322*a*, 322*b* to a head directional valve 410. As described below, the head directional valve 410 may be considered to have a first (or fold) position 410*a*, a second (or unfold) position 410*b*, and a third (or default) position 410*c*. The head directional valve 410 may be solenoid valve commanded by signals from the controller 120 into one or more of the positions 410*a*, 410*b*, 410*c*. Depending on respective function during various modes or operation (e.g., retraction, extension, resume), the lines 400, 401, 402, 403 may be considered supply lines or drain lines.

A shuttle valve 420 is fluidly coupled to the head directional valve 410 via lines 422, 424, respectively attached to opposite ends of the shuttle valve 420. A first counterbalance valve 430 is fluidly coupled to the head directional valve 410 via line 422, and a second counterbalance valve 432 is fluidly coupled to the head directional valve 410 via line 422. In one example, the first counterbalance valve 430 may be actuated by a pilot line 434 extending to line 424, and the second counterbalance valve 432 may be actuated by a pilot line 436 extending to line 422, as discussed in greater detail below, in order to selectively restrict the flow of fluid from the fold actuators 220, 230.

A distribution element 440 is fluidly coupled to the first counterbalance valve 430 via line 442 and operates to split the flow from (and combine the flow to, as appropriate) the first counterbalance valve 430, and thus, line 422. As shown, the distribution element 440 divides the flow from line 422 between line 444, which is fluidly coupled to port 324*a*, and line 446, which is fluidly coupled to port 324*c*. As such, and as discussed in greater detail below, lines 444, 446 supply fluid flow to, or receive flow from, the retraction-side of fold actuator 220, 230. Returning again to the flow path of line 424, a line 450 extends from the second counterbalance valve 432 and extends to port 324*b*, which in turn is fluidly coupled to the extension-side of the left wing fold actuator 220. A line 452 branches from line 450 and is selectively fluidly coupled to port 324*d* via an isolation valve 456. The isolation valve 456 may include a first position 456*a* in which line 452 is fluidly coupled to port 324*d* and a second position 456*b* in which line 452 is not fluidly coupled to port 324*d*. As such, when the isolation valve 456 is in the first position 456*a*, flow from line 450 is also directed through line 452 to port 324*d*, which in turn is fluidly coupled to the extension-side of the right wing fold actuator 230. In this example, valve 456 is solenoid valve with spring return.

Returning to shuttle valve 420, a line 460 extends from the center port of the shuttle valve 420 and is fluidly coupled to port 324*i* and, via line 462, to port 324*k*. As such, flow from the shuttle valve 420 may be directed through lines 460, 462, 362, 364 and ports 324*i*, 324*k* to the retraction-sides of the deck plate actuators 180, 190.

In addition to fluidly connecting the deck plate actuators 180, 190 to the pressure paths controlling the fold actuators 220, 230, pressure from line 460 may also be used to retract the lock actuators 200, 210 via lines 464, 466, 354, 356 and ports 324*e*, 324*g*. Line 464 extends from line 460 to port 324*g*, and line 466 extends from line 464 to port 324*e*. A check valve 470 may be positioned on line 464 to selectively check or prevent flow from the retraction-side of the lock actuators 200, 210 to line 460 based on the pressure in pilot line 472, discussed in greater detail below.

As such, and as discussed in greater detail below, fluid pressure into port 322*a* may be used to retract all six actuators 180, 190, 200, 210, 220, 230 when the head directional valve 410 is in the first position 410*a*; and fluid pressure into port 322*a* may be used to extend the fold actuators 220, 230 and retract the lock and deck plate actuator 180, 190, 200, 210 when the head directional valve 410 is in the second position 410*b*.

The valve block 300 may also include a number of flow paths that interact directly with the primary lines 400, 401, 402, 403 that are introduced briefly here and the functions to which will be discussed in greater detail below. Returning briefly to the first primary lines 400, 401, a line 480 extends from the first primary line 400 to the second primary line 402 with a check valve 482 on line 480 to prevent the flow of fluid from port 322*a* through line 400 to line 402. Additionally, line 484 extends from primary line 400 to port 324*j*, thereby enabling selective extension of the left deck plate actuator 180, as discussed in greater detail below. A blocker valve 490 is positioned on line 484 to selectively block flow through line 484 in a first position 480*a* and allow flow through line 484 in a second position 480*b*. In this example, the blocker valve 490 may be solenoid activated based on signals from the controller 120 and spring returned.

A check valve 492 is also positioned on line 480 to enable flow through line 480 to port 324*j* while selectively blocking flow in the opposite direction based on a pilot line 494. An orifice restriction 496 is also positioned on line 484 to prioritize distribution of flow through line 484 to port 324*j* relative to other flow paths, as discussed in greater detail below. A line 500 extends from line 484 and with line 502 fluidly couples line 484 to ports 324*f*, 324*h* and the extension-sides of lock actuators 200, 210, as discussed in greater detail below.

Referring to line 402, a line 510 extends from line 402 at a position along the lines 402, 403 in between the port 322*b* and the head directional valve 410. A check valve 512 is positioned on line 402 to block the flow of fluid from port 322*b* to lines 403, 510, while enabling flow in the opposite direction. Line 520 extends from line 510 to line 500, which as discussed above is fluidly coupled to ports 324*f*, 324*h*. A check valve 522 is positioned on line 520 to enable flow from line 510 to line 520 while selectively preventing flow from line 520 to line 510 depending on the pressure in pilot line 524. Line 530 also extends from line 510 to line 540, which in turn is fluidly coupled to port 324*l*, and thus, the extension-side of the right deck plate actuator 190. A check valve 532 is arranged on line 530 to enable flow from line 530 to port 324*l* while selectively preventing flow from port 324*l* through line 530 depending on the pressure in pilot line 534. Line 540 extends from line 402 to port 324*l*, which as noted above, is fluidly coupled to the extension-side of the right deck plate actuator 190. A check valve 542 is positioned on line 540 to enable flow from line 540 to port 324*l* while selectively preventing flow from port 324*l* through line 540 to line 404 depending on the pressure in pilot line 544. The orifice restriction 546 is positioned on line 540 to prioritize flow, particularly with respect to the extension of the lock actuators 200, 210, discussed below.

A force relief arrangement 550 is further included as part of the head hydraulics 240 within the block 300. In one example, the force relief arrangement 550 includes a solenoid flow mechanism 552 and a pressure relief valve 554 that are fluidly coupled between the first primary line 401 and the second primary line 403 via lines 556, 558. Upon command, the solenoid flow mechanism 552 is activated such that fluid flows from line 401 through the line 556 to the pressure relief valve 554, and the pressure relief valve 554 directs the fluid to line 403, thereby functioning to reduce the pressure in line 401 to the predetermined value associated with valve 554. In other words, when activated, the force relief arrangement 550 functions to "vent" line 401 into line 403. The pressure relief valve 554 may have any suitable setting, such as 900 psi. The result of reduced pressure in line 401 is to reduce the pressure through head directional valve 410, and thus to the downstream actuators 180, 190, 200, 210, 220, 230, particularly the fold actuators 220, 230. As described below, the force relief arrangement 550 may be actuated at the end portion (e.g., the last 33%, 25%, 10%, or any suitable selected value) of the fold or unfold process. Additional details regarding to the function of the force relief arrangement 550 are provided below.

In one example, the solenoid flow mechanism 552 may be a solenoid valve activated based on sensor and/or controller signals and spring returned, while in other examples, the solenoid flow mechanism 552 may be hydraulically actuated. In particular, the solenoid flow mechanism 552 may be activated based on signals from a sensor (e.g., sensor 124 of FIG. 1) that monitors a wing angle value and/or that monitors the position of the fold actuators 220, 230. One or more examples of hydraulically activated force relief valves are provided below.

Operation of the hydraulics 114, 240 of the adjustment system 106 will now be described with respect to particular functions, processes, and states. As described below, the adjustment system 106 operates to implement the following: 1) a fold process in which the wing segments 130, 140 are pulled from an unfold state up and onto a center segment 150 as a folded state, which further includes unlocking the lock assemblies 136, 146 and decoupling the wing deck plate rods 134, 144 from the center deck plate rod 154; 2) a fold force relief function at the end of the fold process; 3) an unfold process in which the wing segments 130, 140 are pulled from fold state on the center segment 150 and back onto the ground as the unfolded state; 4) an unfold force relief function at the end of the unfold process; and 5) a locking and resume function after completing the unfold process in which the lock assemblies 136, 146 are locked and the deck plate rods 134, 144, 154 are returned to most recent position.

Regarding the fold process, the controller 120 generates a fold command to the vehicle hydraulics 114 and/or head hydraulics 240. Such a command may be generated in response to an operator input via the operator interface 122 (FIG. 1). Generally, the hydraulics 114, 240 operate to fold the wing segments 130, 140 by 1) retracting the lock actuators 200, 210 in order to unlock the wing segments 130, 140 relative to the center segment 150; 2) retracting the deck plate actuators 180, 190 to decouple the wing deck plate rods 134, 144 from the center deck plate rod 154; and 3) retracting the fold actuators 220, 230 to pull and fold the wing segments 130, 140 up and onto the center segment 150, as will now be described.

Upon generation of the fold command, the pump 304 is initiated to pressurize line 310, and the vehicle directional valve 308 is shifted into position 308*a* such that fluid flows through the element 312 and through line 314 to port 322*a*. From port 322*a*, the fluid flows through line 400 and line 402 to head directional valve 410. During the fold command, the controller 120 places the head directional valve 410 in position 410*a* such that line 422 is pressurized. Upon line 422 being pressurized, the shuttle valve 420 operates to such that the fluid pressurizes line 460. From line 460, the fluid flows through line 464, through check valve 470, additionally through line 466, and through ports 324*e*, 324*g* and lines 354, 356 to the retraction-sides of cylinders 202, 212, thereby retracting the lock actuators 200, 210. Additionally from line 460, the fluid further flows through line 462, and through ports 324*i*, 324*k* and lines 374, 376 to the retraction-sides of cylinders 182, 192, thereby retracting the deck plate actuators 180, 190. Further, from line 422, the fluid flows through valve 430, through the distribution element 440, through lines 444, 446, and through ports 324*a*, 324*c* to the retraction-sides of cylinders 222, 232, thereby retracting the fold actuators 220, 230.

It should also be noted that the controller 120 may activate one or more additional valves during the fold process. In particular, the controller 120 may place valve 490 in the second position 490*b* in order to block any flow of fluid from line 400 through line 484, and the controller 120 may place valve 456 into the first position 456*a* in order to enable drain paths, as discussed in greater detail below.

At a predetermined position or pressure of the fold actuators 220, 230, the controller 120 also activates the force relief arrangement 550, particularly by activating the solenoid flow mechanism 552. As introduced above, the controller 120 may activate the relief arrangement 550 with one or more types of sensors (e.g., a mechanical sensor that determines the angle of the wing frames 132, 142 relative to the center frame 152, an actuator sensor that determines the position of the actuator rods 224, 234 relative to the cylinders 222, 232) or according to a hydraulic activation. In one example, the controller 120 may active the force relief arrangement 550 during the final third of the retraction stroke of the fold actuators 220, 230. In other examples, the force relief arrangement 550 may be activated in the final 25% or the final 10% of the fold process. As noted above, relief arrangement 550 operates to vent a portion of the pressure from line 402 to line 406, thereby reducing the pressure to the fold actuators 220, 230 and therefore reducing the force that the actuators 220, 230 place upon the frames 132, 142, 152 upon folding the wing frames 132, 142 of the wing segments 130, 140 onto the center frame 152 of the center segment 150.

During the fold process, the adjustment system 106 also forms drain paths for fluid to be directed out of the head hydraulics 240 and back into the drain 306. For example, as the fold actuators 220, 230 are retracted, fluid from the extension-side of the cylinders 222, 232 flows through line 355, 357; through ports 324*b*, 324*d*; through lines 450, 452 and valve 456; through valves 432, 410; through lines 406, 404; out of port 322*b*; through line 316 and element 312; and through valve 308 and line 311 to the drain 306. Similarly, as the lock actuators 200, 210 are retracted, fluid from the extension-side of the cylinders 202, 212 flows through lines 355, 357; through ports 324*f*, 324*h*; through line 500, 502; through valve 522 (actuated by pilot line 524); through lines 510, 520; through valve 512; through line 404; through port 322*b*; through line 316 and element 312; and through valve 308 and line 311 to the drain 306. Further, as the deck plate actuators 180, 190 are retracted, fluid from the extension-side of the cylinders 182, 192 flows through lines 363, 365; through ports 324*j*, 324*l*; through lines 520, 530; through check valves 522, 532 (actuated by pilot lines 524, 534); through lines 510; through valve 512; through line 404; through port 322*b*; through line 316 and element 312; and through valve 308 and line 311 to the drain 306.

It should be noted that during the retraction of the fold actuators 220, 230, the counterbalance valves 430, 432 operate to modulate the folding of the wing segments 130, 140. In particular, as the wing segments 130, 140 rise off the ground and pass through a vertical orientation, gravity will add to the force from the fold actuators 220, 230 that pull the wing segments 130, 140 down onto the center segment 150. Unless otherwise addressed, the wing segments 130, 140 may fall onto the center segment 150. However, during retraction, the counterbalance valve 432 in the drain path may be actuated to at least partially close based on pressure in pilot line 434, which functions to maintain an opposing or ("counterbalance") pressure in the extension-side of the cylinders 222, 232 of the fold actuator 220, 230 to prevent the wing segments 130, 140 from falling too quickly. For example, when gravity is pulling down the wing segments 130, 140, the pressure in line 422 drops and actuates the counterbalance valve 432 via pilot line 434 to restrict or throttle the flow out of the fold actuators 220, 230. The counterbalance valve 432 may have any suitable setting, such as 3100 psi.

During the fold process, the pressure in line 422 operates to reposition the fold actuators 220, 230 and, via line 460, further operates to reposition the lock actuators 200, 210 and the deck plate actuators 180, 190. Since the lock actuators 200, 210 and the deck plate actuators 180, 190 are actuated at lower pressures than the fold actuators 220, 230, the lock actuators 200, 210 and the deck plate actuators 180, 190 are actuated sooner than the deck plate actuators 180, 190. In other words, the lock assemblies 136, 146 are unlocked and the wing deck plate rods 134, 144 are retracted prior to lifting the wing segments 130, 140. Additionally and as noted above, retraction of the lock actuators 200, 210 also functions to pivot at least one of the pivot covers 160.

Regarding the unfold process, the controller 120 generates an unfold command to the vehicle hydraulics 114 and/or head hydraulics 240. Such a command may be generated in response to an operator input via the operator interface 122 (FIG. 1). Generally, the adjustment system 106 operates to fold the wing segments 130, 140 by extending the fold actuators 220, 230 to pull and fold the wing segments 130, 140 up and off the center segment 150 and onto the ground. As described below, the unfold process may include an unfold force relief function and be followed by a locking and resume function.

Upon generation of the unfold command, the pump 304 is initiated to pressurize line 310, and the vehicle directional valve 308 is positioned in position 308*a* such that fluid flows through the element 312 and through line 314 to port 322*a*. From port 322*a*, the fluid flows through line 400 and line 402 to head directional valve 410. During the unfold command, the controller 120 places the head directional valve 410 in position 410*b* such that line 424 is pressurized. Upon line 424 being pressurized, the shuttle valve 420 operates to such that the fluid pressurizes line 460. From line 460, the fluid flows through line 464, through check valve 470, additionally through line 466, and through ports 324*e*, 324*g* and lines 354, 356 to the retraction-sides of cylinders 202, 212, thereby retracting the lock actuators 200, 210. Additionally, from line 460, the fluid further flows through line 462, and through ports 324*i*, 324*k* and lines 362, 364 to the retraction-sides of cylinders 182, 192, thereby retracting the deck plate actuators 180, 190. Further, from line 424, the fluid flows through valve 432, through line 450 to port 324*b*, through line 355 to the extension-side of the cylinder 222 of fold actuator 220, as well as through line 452, through valve 456, port 324*d*, line 357 to the extension-side of cylinder 232 of fold actuator 230. It is noted that the valve 456 is placed in position 456*a* in order to allow flow of fluid through line 452 to port 324*d*. Pressure in the extension-sides of the cylinders 222, 232 operates to extend the fold actuators 220, 230 and unfold the wing segments 130, 140.

It should also be noted that the controller 120 may activate one or more additional valves during the unfold process. In particular, the controller 120 may place valve 490 in the second position 490*b* in order to block any flow of fluid from line 400 through line 484, and the controller 120 may place valve 456 into the first position 456*a* in order to enable drain paths, as discussed in greater detail below.

At a predetermined position or pressure of the fold actuators 220, 230, the controller 120 also activates the force relief arrangement 550, particularly by activating the solenoid flow mechanism 552. The force relief arrangement 550 may operate as described above at the final third (or other position) of the unfold process. As noted above, relief arrangement 550 operates to vent a portion of the pressure from line 402 to line 406, thereby reducing the pressure to the fold actuators 220, 230 and therefore reducing the force that the actuators 220, 230 place upon the frames 132, 142, 152 upon unfolding the wing frames 132, 142 of the wing segments 130, 140 onto ground.

During the unfold process, the adjustment system 106 also forms drain paths for fluid to be directed out of the head hydraulics 240 and back into the drain 306. For example, as the fold actuators 220, 230 are extended, fluid from the retraction-side of the cylinders 222, 232 flows through line 354, 356; through ports 324*a*, 324*c*; through lines 444, 446 and distribution element 440; through line 442, through valve 430; through line 422, through valve 410; through lines 403, 402; out of port 322*b*; through line 316 and element 312; and through valve 308 and line 311 to the drain 306.

During the unfold process, the lock actuators 200, 210 and deck plate actuators 180, 190 are maintained in the retracted states by the pressure in line 460.

It should be also noted that during the extension of the fold actuators 220, 230, the counterbalance valves 430, 432 operate to modulate the folding of the wing segments 130, 140. In particular, as the wing segments 130, 140 rise off the center segment 150 and pass through a vertical orientation, gravity will add to the force from the fold actuators 220, 230 that pull the wing segments 130, 140 down onto the ground. Unless otherwise addressed, the wing segments 130, 140 may fall onto the ground. However, during extension, the counterbalance valve 430 in the drain path may be actuated to at least partially close based on pressure in pilot line 436, which functions to maintain an opposing or ("counterbalance") pressure in the retraction-side of the cylinders 222, 232 of the fold actuator 220, 230 to prevent the wing segments 130, 140 from falling too quickly. The counterbalance valve 430 may any suitable setting, such as 3100 psi.

Upon completion of the unfold process, the controller 120 initiates lock and resume function. The lock and resume functions are generally initiated automatically, although in other examples, it may be manually initiated by the operator.

During typical agricultural operation in the unfolded state, the deck plates 170 have a selected spacing, and although such spacing may be adjusted by the operator, as described below, the operator generally desires to maintain the spacing upon returning to the unfolded state. As such, a sensor (e.g., sensor 124) may determine and store a current operational deck plate spacing value associated with the deck plates 170 (and/or deck plate actuators 180, 190) prior to initiation of a folding process. As noted above, the corn head adjustment system 106 initiates the folding process in order to decouple the wing deck plate rods 134, 144, unlock the lock assemblies 136, 146, and pull the wing segments 130, 140 into the folded state, e.g., for transport or storage. In order to return the corn head 104 to the unfolded state, the controller 120 implements the unfolding process in order to pull the wing segments 130, 140 back into the unfolded state, as detailed above. Upon returning to the unfolded state, the corn head adjustment system 106 may initiate a deck plate resume function to adjust the deck plate actuators 180, 190 (and thus, the deck plates 170) according to the stored current operational deck plate spacing value associated with the position of the deck plates 170 prior to the previous fold process. The deck plate resume function may also operate to lock the lock assemblies 136, 146.

In order to implement the deck plate resume function, the controller 120 actives the pump 304 and commands the valve 308 into the first position 308*a*, which operates to pressurize line 314 and direct fluid into the block 300 through port 322*a*. The head directional valve 410 is maintained in the third position 410*c* and the valve 490 is maintained in the second position 410*b* such that fluid in the first primary line 400 flows into and through line 484. The fluid flows through valve 490 and through check valve 492. Due to the orifice restriction 496 on line 484, fluid from line 484 initially flows from line 484 into line 500 and then line 502 in order to direct fluid into the extension-sides of the lock actuators 200, 210, thereby operating lock the lock assemblies 136, 146, described above. Fluid flows out of the retraction-sides of the lock actuators 200, 210; through lines 358, 360; through ports 324*g*, 324*e*; through lines 464, 466; through valve 470 (opened via pressure on pilot line 472); through line 460; through valve 410; through lines 403, 402; out of block 300 via port 322*b*; through line 316; and into element 312 via port 318*b* to be directed to drain 306 via valve 308 and line 311. Upon extending the lock actuators 200, 210, the fluid flows through the orifice restriction 496 on line 484 to port 324*j* and line 363 into the extension-side of the left deck plate actuator 180, thereby moving the left wing deck plate rod 134 toward the center deck plate rod 154. The fluid from the extension-side of the left deck plate actuator 180 may flow from line 362, through port 324*i*; through line 460; through valve 410; through lines 403, 402; out of block 300 via port 322*b*; through line 316; and into element 312 via port 318*b* to be directed to drain 306 via valve 308 and line 311.

A sensor (e.g., sensor 124) may monitor the left deck plate actuator 180 (or corresponding parameter) to determine when the left wing deck plate rod 134 reaches a position corresponding to the current operational deck plate spacing value. Upon reaching this position, the controller 120 repositions the vehicle directional valve 308 in order to terminate adjustment of the left deck plate actuator 180 and to initiate adjustment of the right deck plate actuator 190. In particular, the controller 120 activates the pump 304 and commands the valve 308 into the second position 308*b*, which operates to pressurize line 316 and direct fluidly into the block 300 through port 322*b*. The head directional valve 410 is maintained in the third position 410*c* and the valve 490 is maintained in the second position 409*b*. Fluid in the second primary line 402 flows into and through line 540. The fluid flows through check valve 542, orifice restriction 546 and out of port 324*l* through line 365 to the extension-side of the right deck plate actuator 190, thereby moving the right wing deck plate rod 144 towards the center deck plate rod 154.

A sensor (e.g., sensor 124) may monitor the right deck plate actuator 190 (or a corresponding parameter) to determine when the right wing deck plate rod 144 reaches a position corresponding to the current operational deck plate spacing value. Upon reaching this position, the controller 120 terminates the resume function and repositions the vehicle directional valve 308 into the third (or default) position 308*c*.

During or prior to an agricultural operation in the unfolded state, regardless of whether or not a fold and/or an unfold process has been completed, an operator may desire to modify or adjust the spacings of the deck plates 170 (FIG. 4) in order to modify or improve performance of the agricultural operation by moving the deck plate actuators 180, 190 in a common direction.

In one example, the spacings may be increased by extending the left deck plate actuator 180 and retracting the right deck plate actuator 190. In order to direct fluid into the extension-side of the left deck plate actuator 180 and into the retraction-side of the right deck plate actuator 190, the controller 120 actives the pump 304 and commands the valve 308 into the first position 308*a*, which operates to pressurize line 314 and direct fluidly into the block 300 through port 322*a*. The head directional valve 410 is maintained in the third position 410*c* and the valve 490 is maintained in the second position 409*b* such that fluid in the first primary line 400 flows into and through line 484. The fluid flows through valve 490, check valve 492, orifice restriction 496 and out of port 324*j* through line 363 to the extension-side of the left deck plate actuator 180. Extension of the deck plate actuator 180 operates to push fluid out of the retraction-side of the left deck plate actuator 180 into port 324*i*, through line 462, and through port 324*k* through line 364 into the retraction-side of the right deck plate actuator 190. Retraction of the deck plate actuator 190 operates to push fluid out of the extension-side of the right deck plate actuator 190 into port 324*l*, through line 540 (including through valve 542 that has been opened by pilot pressure in line 544), through line 402, out of port 322*b*, through line 316, through element 312, and through line 311 to the drain 306.

In one example, the spacings may be decreased by retracting the left deck plate actuator 180 and extending the right deck plate actuator 190. In order to direct fluid into the extension-side of the right deck plate actuator 190 and into the extension-side of the left deck plate actuator 180, the controller 120 actives the pump 304 and commands the valve 308 into the second position 308*b*, which operates to pressurize line 316 and direct fluidly into the block 300 through port 322b. The head directional valve 410 is maintained in the third position 410c and the valve 490 is maintained in the second position 409b. Fluid in the second primary line 402 flows into and through line 540. The fluid flows through check valve 542, orifice restriction 546 and out of port 324l through line 365 to the extension-side of the right deck plate actuator 190. Extension of the right deck plate actuator 190 operates to push fluid out of the retraction-side of the right deck plate actuator 190 into port 324k, through line 462, and through port 324i through line 362 into the retraction-side of the left deck plate actuator 180. Retraction of the left deck plate actuator 180 operates to push fluid out of the extension-side of the left deck plate actuator 180 into port 324j, through line 484 (including through valve 492 that has been opened by pilot pressure in line 494), through line 400, out of port 322a, through line 314, through element 312, and through line 311 to the drain 306.

During typical operation of the agricultural machine 100 during an agricultural event, the wing segments 130, 140 are maintained in an unfolded position in which the fold actuators 220, 230 are extended, and further, the lock actuators 200, 210 and the deck plate actuators 180, 190 are both extended in order to lock the wing segments 130, 140 to the center segment 150 and to couple the wing deck plate rods 134, 144 to the center deck plate rod 154, respectively. During this state, the valve 410 is in the third position 410c, the valve 456 is in the second position 456b, the valve 490 is in the second position 490b, and the valve 308 is in the third position 308c.

Figure 21:
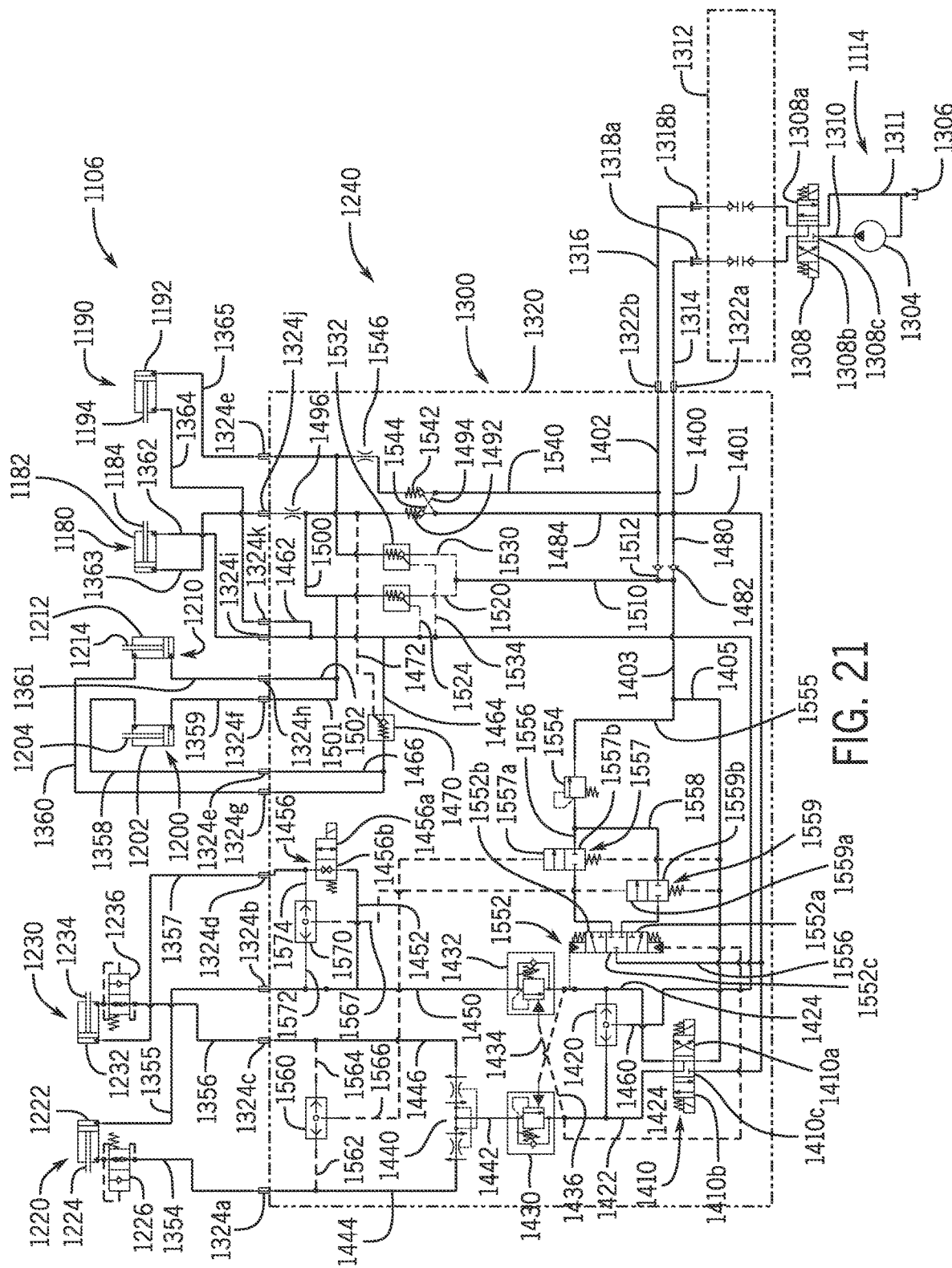
FIG. 21 is a schematic view of the corn head adjustment system of the agricultural machine of FIG. 1 according to another example.

FIG. 21 is a schematic view of a corn head adjustment system 1106 that be implemented into the agricultural machine 100 of FIG. 1 according to a further embodiment. Unless other noted, the corn head adjustment system 1106 may be similar to the corn head adjustment system 106 discussed above. Generally, the corn head adjustment system 1106 performs the functions described above, albeit with more hydraulic-based components. Such a modification may enable a broader or more generic control scheme.

As above, the corn head adjustment system 1106 includes vehicle hydraulics 1114 and head hydraulics 1240 that operate the actuators 1180, 1190, 1200, 1210, 1220, 1230. In this example, a portion of the head hydraulics 1240 is embodied within a corn head valve block 1300 that may be mounted on a center segment of the corn head.

As shown, the vehicle hydraulics 1114 may include a pump 1304, drain or source 1306, and a vehicle directional valve 1308 fluidly coupled to supply and drain lines 1310, 1311. The vehicle directional valve 1308 may be solenoid valve with positions 1308a, 1308b, 1308c. A combine head coupling mechanism 1312 couples the vehicle hydraulics 1114 to the head hydraulics 1240 via lines 1314, 1316 to ports 1318a, 1318b.

In one example, the valve block 1300 includes a body 1320 with the two primary ports 1322a, 1322b and a number of actuator ports 1324a-1324l. As above, the actuators includes a left wing fold actuator 1220 and right wing fold actuator 1230, each with a cylinder 1222, 1232 and a rod 1224, 1234. The fold actuators 1220, 1230 are coupled to ports 1324a-1324d via lines 1354-1357, on which "velocity fuse" valve 1226, 1236 may be provided.

The actuators further include a left wing lock actuator 1200 and a right wing lock actuator 1210, each with a cylinder 1202, 1212 and a rod 1204, 1214. The lock actuators 1200, 1210 are coupled to ports 1324e-1324h via lines 1358-1361.

The actuators further includes a left deck plate actuator 1180 and the right deck plate actuator 1190, each with a cylinder 1182, 1182 and a rod 1184, 1194. The deck plate actuators 1180, 1190 are coupled to ports 1324i-1324l via lines 1362-1365.

Returning to block 1300, in this example, first primary lines 1400, 1401 and second primary lines 1402, 1403 extend between primary ports 1322a, 1322b to a head directional valve 1410, which has three positions 1410a, 1410b, 1410c controlled by signals from a controller.

A shuttle valve 1420 is fluidly coupled to the head directional valve 1410 via lines 1422, 1424, respectively attached to opposite ends of the shuttle valve 1420. A first counterbalance valve 1430 is fluidly coupled to the head directional valve 1410 via line 1422, and a second counterbalance valve 1432 is fluidly coupled to the head directional valve 1410 via line 1422. In one example, the first counterbalance valve 1430 may be actuated by a pilot line 1434 extending to line 1424, and the second counterbalance valve 1432 may be actuated by a pilot line 1436 extending to line 1422 in order to selectively restrict the flow of fluid from the fold actuators 1220, 1230, as discussed above.

A distribution element 1440 is fluidly coupled to the first counterbalance valve 1430 via line 1442 and operates to split the flow from (and combine the flow to, as appropriate) the first counterbalance valve 1430, and thus, line 1422. As shown, the distribution element 1440 divides the flow from line 1422 between line 1444, which is fluidly coupled to port 1324a, and line 1446, which is fluidly coupled to port 1324c. As such, and as discussed in greater detail below, lines 1444, 1446 supply fluid flow to, or receive flow from, the retraction-side of fold actuator 1220, 1230. Returning again to the flow path of line 1424, a line 1450 extends from the second counterbalance valve 1432 and extends to port 1324b, which in turn is fluidly coupled to the extension-side of the left wing fold actuator 1220. A line 1452 branches from line 1450 and is selectively fluidly coupled to port 1324d via an isolation valve 1456.

Returning to shuttle valve 1420, a line 1460 extends from the center port of the shuttle valve 1420 and is fluidly coupled to port 1324i and, via line 1462, to port 1324k. As such, flow from the shuttle valve 1420 may be directed through lines 1460, 1462, 1362, 1364 and ports 1324i, 1324k to the retraction-sides of the deck plate actuators 1180, 1190.

In addition to fluidly connecting the deck plate actuators 1180, 1190 to the pressure paths controlling the fold actuators 1220, 1230, pressure from line 1460 may also be used to retract the lock actuators 1200, 1210 via lines 1464, 1466, 1354, 1356 and ports 1324e, 1324g. A check valve 1470 may be positioned on line 1464 to selectively check or prevent flow from the retraction-side of the lock actuators 1200, 1210 to line 1460 based on the pressure in pilot line 1472, discussed in greater detail below.

As such, and as discussed in greater detail below, fluid pressure into port 1322a may be used to retract all six actuators 1180, 1190, 1200, 1210, 1220, 1230 when the head directional valve 1410 is in the first position 1410a, and fluid pressure into port 1322a may be used to extend the fold actuators 1220, 1230 and retract the lock and deck plate actuator 1180, 1190, 1200, 1210 when the head directional valve 410 is in the second position 1410b, similar to the fold and unfold processes discussed above.

The valve block 1300 may also include a number of flow paths that interact directly with the primary lines 1400, 1401, 1402, 1403 that are introduced briefly here and the functions to which will be discussed in greater detail below. Returning briefly to the first primary lines 1400, 1401, a line 1480 extends from the first pressure line 1400 to the second primary line 1402 with a check valve 1482 on line 1480 to prevent the flow of fluid from port 1322*a* through line 1400 to line 1402. Additionally, line 1484 extends from primary line 1400 to port 1324*j*, thereby enabling selective extension of the left deck plate actuator 1180. A check valve 1492 is also positioned on line 1484 to enable flow through line 1484 to port 1324*j* while selectively blocking flow in the opposite direction based on a pilot line 1494. A restriction orifice 1496 is also positioned on line 1484 to prioritize distribution of flow through line 1484 to port 1324*j* relative to other flow paths. A line 1500 extends from line 1484 and with lines 1501, 1502 fluidly couples line 1484 to ports 324*f*, 324*h* and the extension-sides of lock actuators 1220, 1230.

Referring to line 1402, a line 1510 extends from line 1402 and a check valve 1512 is positioned on line 1402. Line 1520 extends from line 1510 to line 1500, which as discussed above is fluidly coupled to ports 1324*f*, 1324*h*. A check valve 1522 is positioned on line 1520. Line 1530 also extends from line 1510 to line 1540, which in turn is fluidly coupled to port 1324*l*, and thus, the extension-side of the right deck plate actuator 1190. A check valve 1532 is arranged on line 1530. Line 1540 extends from line 1402 to port 1324*l*. A check valve 1542 and an orifice restriction 546 are also positioned on line 1540.

Generally, the fold, unfold, lock, unlock, and resume processes and functions are implemented as detailed above with respect to system 1106. However, system 1124 has a modified a force relief arrangement 1550.

In this example, the force relief arrangement 1550 includes a pilot assisted solenoid flow mechanism (or valve) 1552 fluidly coupled to the first pressure line 1401, and a pressure relief valve 1554 coupled to the mechanism 1552 via lines 1556, 1558 to the second primary line 1403.

The pilot assisted solenoid flow mechanism 1552 has three positions, including a first position 1552*a* to fluidly couple line 1556 to line 1555, a second position 1552*b* to fluidly couple line 1556 to line 1558, and closed or default position 1552*c*. A blocker valve 1559 is positioned on line 1558 and a blocker valve 1557 is positioned on line 1556. The blocker valve 1557 is actuated by pilot line 1566 coupled to shuttle valve 1560, which in turn is coupled in between lines 1444, 1446 by pilot lines 1562, 1564; and the blocker valve 1559 is actuated by pilot line 1567 coupled to shuttle valve 1570, which in turn is coupled in between lines 1450, 1452 by pilot lines 1572, 1574.

As such, when line 1422 is pressurized, the directional valve 1552 is placed into position 1552*a* to connect line 1401 to line 1558, albeit selectively blocked by valve 1559. Upon pressurizing pilot line 1567 at shuttle valve 1570, the valve 1559 is opened in order to implement the force relief arrangement 1550. When line 1424 is pressurized, the directional valve 1552 is placed into position 1552*b* to connect line 1401 to line 1556, albeit selectively blocked by valve 1557. Upon pressurizing pilot line 1566 at shuttle valve 1560, the valve 1557 is opened in order to implement the force relief arrangement 1550.

In other words, when activated, the force relief arrangement 1550 functions to "vent" line 1401 into line 1403. The result of reduced pressure in line 1401 is to reduce the pressure through head directional valve 1410, and thus to the downstream actuators 1180, 1190, 1200, 1210, 1220, 1230, particularly the fold actuators 1220, 1230. In effect, the force relief arrangement 1550 may be actuated at the end portion (e.g., the last 33%, 25%, 10%, or any suitable selected value) of the fold or unfold process depending on the pressure setting.

Figure 22:
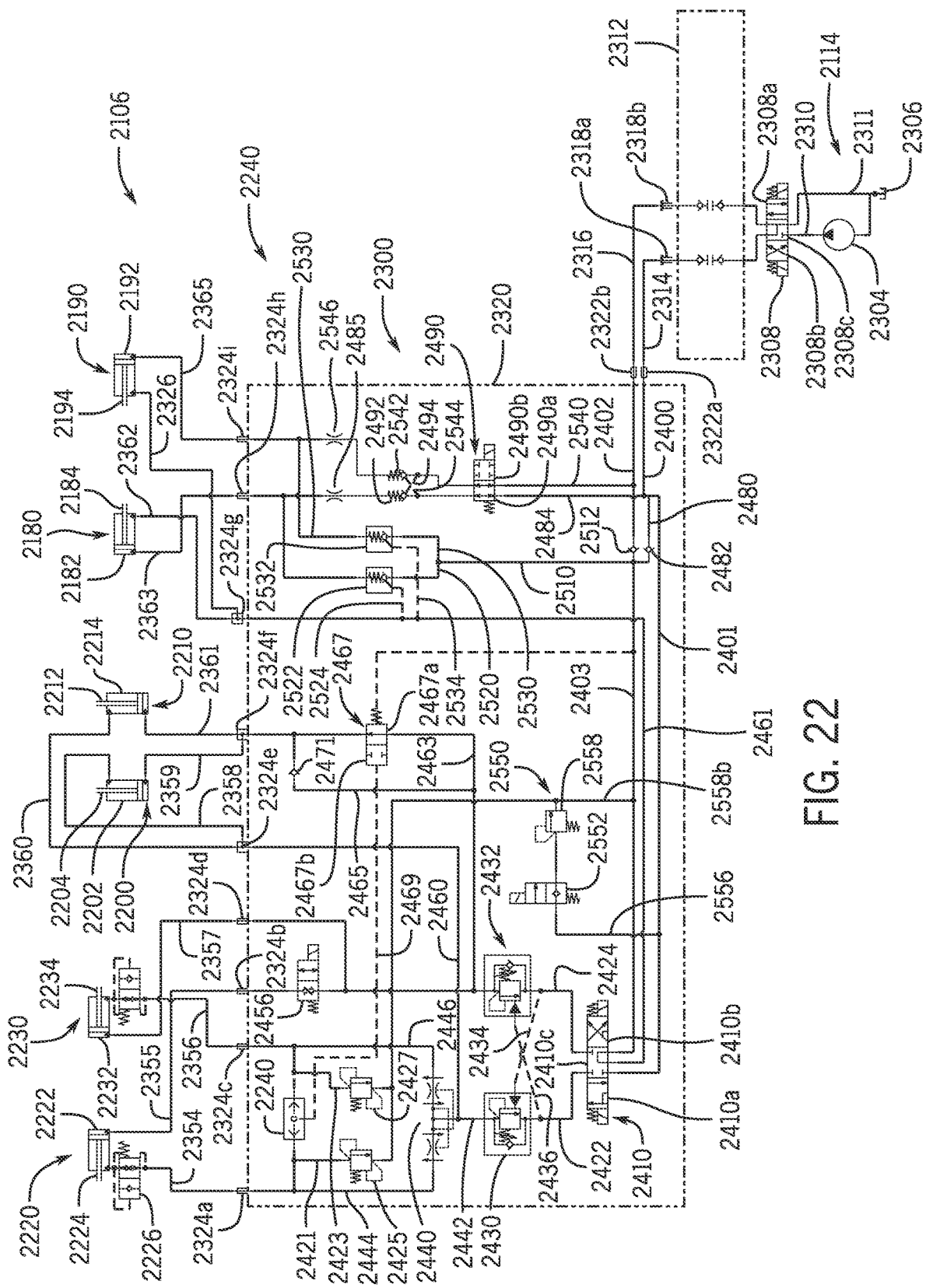
FIG. 22 is a schematic view of the corn head adjustment system of the agricultural machine of FIG. 1 according to a further example.

FIG. 22 is a schematic view of the corn head adjustment system 2106 of the agricultural machine of FIG. 1 according to a further embodiment. Generally, the corn head adjustment system 2106 performs the functions described above, albeit with more "cartridge" components in which at least partial solenoid valves 2398, 2410, 2456, 2490, 2552 are used to selectively distribute pressure to the various actuators 2180, 2190, 2220, 2210, 2220, 2230.

As above, the corn head adjustment system 2106 includes vehicle hydraulics 2114 and head hydraulics 2240 that operate the actuators 2180, 2190, 2200, 2210, 2220, 2230. In this example, a portion of the head hydraulics 2240 is embodied within a corn head valve block 2300 that may be mounted on a center segment of the corn head.

As shown, the vehicle hydraulics 2114 may include a pump 2304, drain or source 2306, and a vehicle directional valve 2308 fluidly coupled to supply and drain lines 2310, 2311. The vehicle directional valve 2308 may be solenoid valve with positions 2308*a*, 2308*b*, 2308*c*. A combine head coupling mechanism 2312 couples the vehicle hydraulics 2114 to the head hydraulics 2240 via lines 2314, 2316 to ports 2318*a*, 2318*b*.

In one example, the valve block 2300 includes a body 2320 with the two primary ports 2322*a*, 2322*b* and a number of actuator ports 2324*a*-2324*i*. As above, the actuators include a left wing fold actuator 2220 and right wing fold actuator 2230, each with a cylinder 2222, 2232 and a rod 2224, 2234. The fold actuators 2220, 2230 are coupled to ports 2324*a*-2324*d* via lines 2354-2357, on which "velocity fuse" valve 2226, 2236 may be provided. The actuators further include a left wing lock actuator 2200 and a right wing lock actuator 2210, each with a cylinder 2202, 2212 and a rod 2204, 2214. The lock actuators 2200, 2210 are coupled to ports 2324*e*, 2324*f* via lines 2358-2361. The actuators further include a left wing deck plate actuator 2180 and the right wing deck plate actuator 2190, each with a cylinder 2182, 2182 and a rod 2184, 2194. The deck plate actuators 2180, 2190 are coupled to ports 2324*g*, 2324*h*, 2324*i* via lines 2362-2365.

Returning to block 2300, in this example, first primary lines 2400, 2401 and second primary lines 2402, 2403 extend between primary ports 2322*a*, 2322*b* to a head directional valve 2410, which has three positions 2410*a*, 2410*b*, 2410*c* controlled by signals from a controller.

A first counterbalance valve 2430 is fluidly coupled to the head directional valve 2410 via line 2422, and a second counterbalance valve 2432 is fluidly coupled to the head directional valve 2410 via line 2422. In one example, the first counterbalance valve 2430 may be actuated by a pilot line 2434 extending to line 2424, and the second counterbalance valve 2432 may be actuated by a pilot line 2436 extending to line 2422 in order to selectively restrict the flow of fluid from the fold actuators 2220, 2230, as discussed above.

Downstream of valve 2430, a line 2460 extends to ports 2324*e* and lines 2358, 2360 to the retract lock actuators 2200, 2210 when line 2422 is pressurized and to receive fluid when lock actuators 2200, 2210 are extended.

A distribution element 2440 is fluidly coupled to the first counterbalance valve 2430 via line 2442 and operates to split the flow from (and combine the flow to, as appropriate) the first counterbalance valve 2430, and thus, line 2422. As shown, the distribution element 2440 divides the flow from line 2422 between line 2444, which is fluidly coupled to port 2324*a*, and line 2446, which is fluidly coupled to port 2324*c*. As such, and as discussed in greater detail below, lines 2444, 2446 supply fluid flow to, or receive flow from, the retraction-side of fold actuator 2220, 2230. Valves 2425, 2427 are positioned on lines 2421, 2423 to selectively direct fluid from lines 2444, 2446 to line 2403.

Returning to line 2424, a line 2463 extends from line 2424 downstream of the counterbalance valve 2432 and extends to port 2324*f* and lines 2359, 2361 to extend actuators 2200, 2210 when line 2422 is pressurized and to receive fluid when the lock actuators 2200, 2210 are retracted. A blocker valve 2467 positioned on line 2463 to selectively block line 2463. The blocker valve 2467 is connected by a pilot line 2469 to a shuttle valve 2420 positioned in between lines 2444, 2446 such that blocker valve 2467 is open when lines 2444, 2446 are not pressurized and closed when lines 2444, 2446 are pressurized, e.g., to block line 2463 when the lock actuators 2200, 2210 are being retracted.

Returning to head directional valve 2410, line 2461 extends from the head directional valve 2410 to port 2324*g* to lines 2362, 2364 in order to retract the deck plate actuators 2180, 2190 when line 2461 is pressurized.

Further, line 2348 extends from line 2400 to port 2324*h* and line 2363 to the extension-side of deck plate actuator 2180. Returning to lines 2402, 2403, line 2540 extends from line 2402 to port 2324*i* to line 2365 to the extension-side of the deck plate actuator 2190. Check valves 2492, 2542, actuated by pilot lines 2494, 2544, and restriction orifices 2485, 2546 are positioned on lines 2484, 2540. A blocker valve 2490 spans the lines 2484, 2540. Line 2510 extends from line 2403 and splits into lines 2520, 2530 that respectively extend to lines 2484, 2540, and a check valve 2522, 2532 is positioned on each line 2520, 2530.

As such, in order to fold the wing segments (e.g., wing segments 130, 140), directional valve 2308 is placed in a first position 2308*a* to pressurize lines 2400, 2401 and directional valve 2410 is placed in the first position 2410*a* to direct fluid to the retraction-sides of the fold actuators 2220, 2230. Additionally, in this state, line 2460 is pressurized to the retraction-sides of lock actuators 2200, 2210. Further, in this state, the valve 2410 directs a portion of the fluid from line 2401 into line 2461 to the retraction-sides of the deck plate actuators 2180, 2190. As a result, a single command and pressure source operates to retract all six actuators 2180, 2190, 2200, 2210, 2220, 2230.

In order to unfold the wing segments (e.g., wing segments 130, 140), directional valve 2308 is placed in a first position 2308*a* to pressurize lines 2400, 2401 and directional valve 2410 is placed in the second position 2410*b* to direct fluid to the extension-sides of the fold actuators 2220, 2230. Additionally, in this state, at times, line 2463 is pressurized to the extension-sides of lock actuators 2200, 2210. Further, in this state, the valve 2410 directs a portion of the fluid from line 2401 into line 2461 to the retraction-sides of the deck plate actuators 2180, 2190.

Additionally, the deck plate actuators 2180, 2190 may implement a resume function and/or an adjustment function by placing the head directional valve 2410 in the default position 2410*c* toggling the directional valve 2308 between the first position 2308*a* and the second position 2308*b*. The system 2124 also has a force relief arrangement 2550 that operates in a similar manner to force relief arrangement 550 discussed above.

Although not shown, operation of the corn head adjustment system discussed above may also be expressed as a method performing the operational steps in accordance with the present disclosure. As can be appreciated in light of the disclosure, the order of operation is not limited to a sequential execution described above, but may be performed in one or more varying orders as applicable and in accordance with the present disclosure. Further one or more operational steps may be omitted and/or additional steps added.

Also, the following examples are provided, which are numbered for easier reference.

1. A corn head configured to be mounted on an agricultural machine; comprising: a first wing segment including a first wing segment frame; a first deck plate rod mounted to the first wing segment frame; and a first series of deck plates, at least a portion of which are repositionable upon lateral movement of first deck plate rod; a center segment arranged proximate to the first wing segment, the center segment including a center frame; a center deck plate rod mounted to the center frame; and a second series of deck plates, at least a portion of which are repositionable upon lateral movement of center deck plate rod; and a corn head adjustment system including: a first fold actuator extending between the first wing segment frame and the center frame; a first deck plate actuator mounted on at least one of the first wing segment frame or the center frame and configured to reposition at least one of the first deck plate rod or the center deck plate rod; and corn head hydraulics fluidly coupled to receive a fluid from a source and to direct the fluid to selectively actuate the first fold actuator in order to fold the first wing segment relative to the center segment, to selectively actuate the first fold actuator in order to unfold the first wing segment relative to the center segment, to selectively actuate the first deck plate actuator in order to decouple the first deck plate rod from the center deck plate rod, and to selectively actuate the first deck plate actuator in order to couple the first deck plate rod to the center deck plate rod, wherein, during a fold process, the corn head hydraulics is configured to actuate the first fold actuator in order to fold the first wing segment relative to the center segment and to actuate the first deck plate actuator in order to decouple the first deck plate rod from the center deck plate rod, and wherein, during an unfold process, the corn head hydraulics is configured to actuate the first fold actuator in order to unfold the first wing segment relative to the center segment.

2. The corn head of example 1, further comprising a second wing segment including a second wing segment frame; a second deck plate rod mounted to the second wing segment frame; and a third series of deck plates, at least a portion of which are repositionable upon lateral movement of second deck plate rod; wherein the corn head adjustment system further includes: a second fold actuator extending between the second wing segment frame and the center frame; a second deck plate actuator mounted on at least one of the second wing segment or the center segment and configured to reposition the second deck plate rod or the center deck plate rod; and wherein the corn head hydraulics is further fluidly coupled to selectively direct the fluid to the second fold actuator and the second deck plate actuator, wherein, during the fold process, the corn head hydraulics is configured to actuate the second fold actuator in order to fold the second wing segment relative to the center segment and to actuate the second deck plate actuator in order to decouple the second deck plate rod from the center deck plate rod, and wherein, during the unfold process, the corn head hydraulics is configured to actuate the second fold actuator in order to unfold the second wing segment relative to the center segment.

3. The corn head of example 2, wherein, during the fold process, the corn head hydraulics is configured to actuate the first deck plate actuator in order to decouple the first deck plate rod from the center deck plate rod prior to actuating the first fold actuator in order to fold the first wing segment relative to the center segment, and further configured to actuate the second deck plate actuator in order to decouple the second deck plate rod from the center deck plate rod prior to actuating the second fold actuator in order to fold the second wing segment relative to the center segment.

4. The corn head of example 2, wherein the corn head adjustment system further includes: a first lock assembly with a first portion mounted on the first wing segment and a second portion mounted on the center segment, the first lock assembly further including a first lock actuator mounted on the first wing segment or the center segment with a locked position that prevents relative movement of the first portion of the first lock assembly and the second portion of a first lock assembly, thereby preventing relative movement of the first wing segment and the center segment, and an unlocked position that enables relative movement of the first portion of the first lock assembly and the second portion of the first lock assembly, thereby enabling relative movement of the first wing segment and the center segment; and a second lock assembly with a first portion mounted on the second wing segment and a second portion mounted on the center segment; the second lock assembly including a second lock actuator mounted on the second wing segment or the center segment with a locked position that prevents relative movement of the first portion of the second lock assembly and the second portion of the second lock assembly, thereby preventing relative movement of the second wing segment and the center segment, and an unlocked position that enables relative movement of the first portion of the second lock assembly and the second portion of the second lock assembly, thereby enabling relative movement of the second wing segment and the center segment.

5. The corn head of example 4, wherein the corn head hydraulics is further fluidly coupled to the first and second lock actuators such that, during the fold process, the first and second lock actuators are moved from the locked positions into the unlocked positions prior to actuating the first and second fold actuators in order to fold the first and second wing segments relative to the center segment.

6. The corn head of example 5, wherein upon completion of the unfold process, the corn head hydraulics are configured to actuate the first and second lock actuators from the unlocked positions to the locked positions.

7. The corn head of example 2, wherein, during the unfold process, the corn head hydraulics is configured to initially maintain the position of the first and second deck plate actuators.

8. The corn head of example 7, wherein, upon completion of the unfold process, the corn head hydraulics is configured to reposition the first and second deck plate actuators according to position values corresponding to a previous unfolded state.

9. The corn head of example 2, wherein the corn head hydraulics comprises a single inlet configured to receive the fluid from the source in order to actuate the first and second fold actuators and the first and second deck plate actuators.

10. The corn head of example 9, wherein the first and second fold actuators are dual-acting, actively controlled cylinder and piston arrangements.

11. The corn head of example 10, wherein the first and second deck plate cylinders are dual-acting, actively controlled cylinder and piston arrangements.

12. A corn head adjustment system for a corn head with a first wing segment and a center segment arranged proximate to the first wing segment; the first wing segment including a first wing segment frame, a first deck plate rod mounted to the first wing segment frame, and a first series of deck plates, at least a portion of which are repositionable upon lateral movement of first deck plate rod; and the center segment including a center frame, a center deck plate rod mounted to the center frame, and a second series of deck plates, at least a portion of which are repositionable upon lateral movement of center deck plate rod, the corn head adjustment system comprising: a first fold actuator extending between the first wing segment frame and the center frame; a first deck plate actuator mounted on at least one of the first wing segment frame or the center frame and configured to reposition at least one of the first deck plate rod or the center deck plate rod; and corn head hydraulics fluidly coupled to receive a fluid from a source and to direct the fluid to selectively actuate the first fold actuator in order to fold the first wing segment relative to the center segment, to selectively actuate the first fold actuator in order to unfold the first wing segment relative to the center segment, to selectively actuate the first deck plate actuator in order to decouple the first deck plate rod from the center deck plate rod, and to selectively actuate the first deck plate actuator in order to couple the first deck plate rod to the center deck plate rod, wherein, during a fold process, the corn head hydraulics is configured to actuate the first fold actuator in order to fold the first wing segment relative to the center segment and to actuate the first deck plate actuator in order to decouple the first deck plate rod from the center deck plate rod, and wherein, during an unfold process, the corn head hydraulics is configured to actuate the first fold actuator in order to unfold the first wing segment relative to the center segment.

13. The corn head adjustment system of example 12, further comprising a second wing segment including a second wing segment frame; a second deck plate rod mounted to the second wing segment frame; and a third series of deck plates, at least a portion of which are repositionable upon lateral movement of second deck plate rod; wherein the corn head adjustment system further includes: a second fold actuator extending between the second wing segment frame and the center frame; a second deck plate actuator mounted on at least one of the second wing segment or the center segment and configured to reposition the second deck plate rod or the center deck plate rod; and wherein the corn head hydraulics is further fluidly coupled to selectively direct the fluid to the second fold actuator and the second deck plate actuator, wherein, during the fold process, the corn head hydraulics is configured to actuate the second fold actuator in order to fold the second wing segment relative to the center segment and to actuate the second deck plate actuator in order to decouple the second deck plate rod from the center deck plate rod, and wherein, during the unfold process, the corn head hydraulics is configured to actuate the second fold actuator in order to unfold the second wing segment relative to the center segment.

14. The corn head adjustment system of example 13, wherein, during the fold process, the corn head hydraulics is configured to actuate the first deck plate actuator in order to decouple the first deck plate rod from the center deck plate rod prior to actuating the first fold actuator in order to fold the first wing segment relative to the center segment, and further configured to actuate the second deck plate actuator in order to decouple the second deck plate rod from the center deck plate rod prior to actuating the second fold actuator in order to fold the second wing segment relative to the center segment.

15. The corn head adjustment system of example 13, wherein the corn head adjustment system further includes: a first lock assembly with a first portion mounted on the first wing segment and a second portion mounted on the center segment, the first lock assembly further including a first lock actuator mounted on the first wing segment or the center segment with a locked position that prevents relative movement of the first portion of the first lock assembly and the second portion of a first lock assembly, thereby preventing relative movement of the first wing segment and the center segment, and an unlocked position that enables relative movement of the first portion of the first lock assembly and the second portion of the first lock assembly, thereby enabling relative movement of the first wing segment and the center segment; and a second lock assembly with a first portion mounted on the second wing segment and a second portion mounted on the center segment; the second lock assembly including a second lock actuator mounted on the second wing segment or the center segment with a locked position that prevents relative movement of the first portion of the second lock assembly and the second portion of the second lock assembly, thereby preventing relative movement of the second wing segment and the center segment, and an unlocked position that enables relative movement of the first portion of the second lock assembly and the second portion of the second lock assembly, thereby enabling relative movement of the second wing segment and the center segment.

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

As will be appreciated by one skilled in the art, aspects of the disclosed subject matter can be described in terms of methods, systems (e.g., control or display systems deployed onboard or otherwise utilized in conjunction with work machines), and computer program products. With respect to computer program products, in particular, embodiments of the disclosure may consist of or include tangible, non-transitory storage media storing computer-readable instructions or code for performing one or more of the functions described throughout this document. As will be readily apparent, such computer-readable storage media can be realized utilizing any currently-known or later-developed memory type, including various types of random access memory (RAM) and read-only memory (ROM). Further, embodiments of the present disclosure are open or "agnostic" to the particular memory technology employed, noting that magnetic storage solutions (hard disk drive), solid state storage solutions (flash memory), optimal storage solutions, and other storage solutions can all potentially contain computer-readable instructions for carrying-out the functions described herein. Similarly, the systems or devices described herein may also contain memory storing computer-readable instructions (e.g., as any combination of firmware or other software executing on an operating system) that, when executed by a processor or processing system, instruct the system or device to perform one or more functions described herein. When locally executed, such computer-readable instructions or code may be copied or distributed to the memory of a given computing system or device in various different manners, such as by transmission over a communications network including the Internet. Generally, then, embodiments of the present disclosure should not be limited to any particular set of hardware or memory structure, or to the particular manner in which computer-readable instructions are stored, unless otherwise expressly specified herein.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The term module may be synonymous with unit, component, subsystem, sub-controller, circuitry, routine, element, structure, control section, and the like.

As used herein, the controller may be considered to be organized as one or more functional units or modules (e.g., software, hardware, or combinations thereof), as well as one or more types of data storage. As an example, each of the modules and data storage may be implemented with processing architecture such as a processor and memory. For example, the controller may implement the modules and data storage with the processor based on programs or instructions stored in memory.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A corn head configured to be mounted on an agricultural machine; comprising:
    a first wing segment including a first wing segment frame;
        a first deck plate rod mounted to the first wing segment frame; and a first series of deck plates, at least a portion of which are repositionable upon lateral movement of the first deck plate rod;
    a center segment arranged proximate to the first wing segment, the center segment including a center frame;
        a center deck plate rod mounted to the center frame; and a second series of deck plates, at least a portion of which are repositionable upon lateral movement of the center deck plate rod; and
    a corn head adjustment system including:
        a first fold actuator extending between the first wing segment frame and the center frame;
        a first deck plate actuator mounted on at least one of the first wing segment frame or the center frame and configured to reposition at least one of the first deck plate rod or the center deck plate rod; and
        corn head hydraulics fluidly coupled to receive a fluid from a source and to direct the fluid to selectively actuate the first fold actuator in order to fold the first wing segment relative to the center segment, to selectively actuate the first fold actuator in order to unfold the first wing segment relative to the center segment, to selectively actuate the first deck plate actuator in order to decouple the first deck plate rod from the center deck plate rod, and to selectively actuate the first deck plate actuator in order to couple the first deck plate rod to the center deck plate rod,
        wherein, during a fold process, the corn head hydraulics is configured to actuate the first fold actuator in order to fold the first wing segment relative to the center segment and to actuate the first deck plate actuator in order to decouple the first deck plate rod from the center deck plate rod, and
        wherein, during an unfold process, the corn head hydraulics is configured to actuate the first fold actuator in order to unfold the first wing segment relative to the center segment.

2. The corn head of claim 1,
further comprising a second wing segment including a second wing segment frame; a second deck plate rod mounted to the second wing segment frame; and a third series of deck plates, at least a portion of which are repositionable upon lateral movement of the second deck plate rod;
wherein the corn head adjustment system further includes:
a second fold actuator extending between the second wing segment frame and the center frame;
a second deck plate actuator mounted on at least one of the second wing segment or the center segment and configured to reposition the second deck plate rod or the center deck plate rod; and
wherein the corn head hydraulics is further fluidly coupled to selectively direct the fluid to the second fold actuator and the second deck plate actuator,
wherein, during the fold process, the corn head hydraulics is configured to actuate the second fold actuator in order to fold the second wing segment relative to the center segment and to actuate the second deck plate actuator in order to decouple the second deck plate rod from the center deck plate rod, and
wherein, during the unfold process, the corn head hydraulics is configured to actuate the second fold actuator in order to unfold the second wing segment relative to the center segment.

3. The corn head of claim 2, wherein, during the fold process, the corn head hydraulics is configured to actuate the first deck plate actuator in order to decouple the first deck plate rod from the center deck plate rod prior to actuating the first fold actuator in order to fold the first wing segment relative to the center segment, and further configured to actuate the second deck plate actuator in order to decouple the second deck plate rod from the center deck plate rod prior to actuating the second fold actuator in order to fold the second wing segment relative to the center segment.

4. The corn head of claim 2, wherein the corn head adjustment system further includes:
a first lock assembly with a first portion mounted on the first wing segment and a second portion mounted on the center segment, the first lock assembly further including a first lock actuator mounted on the first wing segment or the center segment with a locked position that prevents relative movement of the first portion of the first lock assembly and the second portion of a first lock assembly, thereby preventing relative movement of the first wing segment and the center segment, and an unlocked position that enables relative movement of the first portion of the first lock assembly and the second portion of the first lock assembly, thereby enabling relative movement of the first wing segment and the center segment; and
a second lock assembly with a first portion mounted on the second wing segment and a second portion mounted on the center segment; the second lock assembly including a second lock actuator mounted on the second wing segment or the center segment with a locked position that prevents relative movement of the first portion of the second lock assembly and the second portion of the second lock assembly, thereby preventing relative movement of the second wing segment and the center segment, and an unlocked position that enables relative movement of the first portion of the second lock assembly and the second portion of the second lock assembly, thereby enabling relative movement of the second wing segment and the center segment.

5. The corn head of claim 4, wherein the corn head hydraulics is further fluidly coupled to the first and second lock actuators such that, during the fold process, the first and second lock actuators are moved from the locked positions into the unlocked positions prior to actuating the first and second fold actuators in order to fold the first and second wing segments relative to the center segment.

6. The corn head of claim 5, wherein upon completion of the unfold process, the corn head hydraulics are configured to actuate the first and second lock actuators from the unlocked positions to the locked positions.

7. The corn head of claim 2, wherein, during the unfold process, the corn head hydraulics is configured to initially maintain the position of the first and second deck plate actuators.

8. The corn head of claim 7, wherein, upon completion of the unfold process, the corn head hydraulics is configured to reposition the first and second deck plate actuators according to position values corresponding to a previous unfolded state.

9. The corn head of claim 2, wherein the corn head hydraulics comprises a single inlet configured to receive the fluid from the source in order to actuate the first and second fold actuators and the first and second deck plate actuators.

10. The corn head of claim 9, wherein the first and second fold actuators are dual-acting, actively controlled cylinder and piston arrangements.

11. The corn head of claim 10, wherein the first and second deck plate actuators are dual-acting, actively controlled cylinder and piston arrangements.

12. A corn head adjustment system for a corn head with a first wing segment and a center segment arranged proximate to the first wing segment; the first wing segment including a first wing segment frame, a first deck plate rod mounted to the first wing segment frame, and a first series of deck plates, at least a portion of which are repositionable upon lateral movement of the first deck plate rod; and the center segment including a center frame, a center deck plate rod mounted to the center frame, and a second series of deck plates, at least a portion of which are repositionable upon lateral movement of the center deck plate rod, the corn head adjustment system comprising:
a first fold actuator extending between the first wing segment frame and the center frame;
a first deck plate actuator mounted on at least one of the first wing segment frame or the center frame and configured to reposition at least one of the first deck plate rod or the center deck plate rod; and
corn head hydraulics fluidly coupled to receive a fluid from a source and to direct the fluid to selectively actuate the first fold actuator in order to fold the first wing segment relative to the center segment, to selectively actuate the first fold actuator in order to unfold the first wing segment relative to the center segment, to selectively actuate the first deck plate actuator in order to decouple the first deck plate rod from the center deck plate rod, and to selectively actuate the first deck plate actuator in order to couple the first deck plate rod to the center deck plate rod,
wherein, during a fold process, the corn head hydraulics is configured to actuate the first fold actuator in order to fold the first wing segment relative to the center segment and to actuate the first deck plate actuator in order to decouple the first deck plate rod from the center deck plate rod, and wherein, during an unfold process, the corn head hydraulics is configured to actuate the first fold actuator in order to unfold the first wing segment relative to the center segment.

13. The corn head adjustment system of claim 12, further comprising a second wing segment including a second wing segment frame; a second deck plate rod mounted to the second wing segment frame; and a third series of deck plates, at least a portion of which are repositionable upon lateral movement of the second deck plate rod;

wherein the corn head adjustment system further includes:
a second fold actuator extending between the second wing segment frame and the center frame;
a second deck plate actuator mounted on at least one of the second wing segment or the center segment and configured to reposition the second deck plate rod or the center deck plate rod; and
wherein the corn head hydraulics is further fluidly coupled to selectively direct the fluid to the second fold actuator and the second deck plate actuator,
wherein, during the fold process, the corn head hydraulics is configured to actuate the second fold actuator in order to fold the second wing segment relative to the center segment and to actuate the second deck plate actuator in order to decouple the second deck plate rod from the center deck plate rod, and
wherein, during the unfold process, the corn head hydraulics is configured to actuate the second fold actuator in order to unfold the second wing segment relative to the center segment.

14. The corn head adjustment system of claim 13, wherein, during the fold process, the corn head hydraulics is configured to actuate the first deck plate actuator in order to decouple the first deck plate rod from the center deck plate rod prior to actuating the first fold actuator in order to fold the first wing segment relative to the center segment, and further configured to actuate the second deck plate actuator in order to decouple the second deck plate rod from the center deck plate rod prior to actuating the second fold actuator in order to fold the second wing segment relative to the center segment.

15. The corn head adjustment system of claim 13, wherein the corn head adjustment system further includes:
a first lock assembly with a first portion mounted on the first wing segment and a second portion mounted on the center segment, the first lock assembly further including a first lock actuator mounted on the first wing segment or the center segment with a locked position that prevents relative movement of the first portion of the first lock assembly and the second portion of a first lock assembly, thereby preventing relative movement of the first wing segment and the center segment, and an unlocked position that enables relative movement of the first portion of the first lock assembly and the second portion of the first lock assembly, thereby enabling relative movement of the first wing segment and the center segment; and
a second lock assembly with a first portion mounted on the second wing segment and a second portion mounted on the center segment; the second lock assembly including a second lock actuator mounted on the second wing segment or the center segment with a locked position that prevents relative movement of the first portion of the second lock assembly and the second portion of the second lock assembly, thereby preventing relative movement of the second wing segment and the center segment, and an unlocked position that enables relative movement of the first portion of the second lock assembly and the second portion of the second lock assembly, thereby enabling relative movement of the second wing segment and the center segment.

16. The corn head adjustment system of claim 15, wherein the corn head hydraulics is further fluidly coupled to the first and second lock actuators such that, during the fold process, the first and second lock actuators are moved from the locked positions into the unlocked positions prior to actuating the first and second fold actuators in order to fold the first and second wing segments relative to the center segment.

17. The corn head adjustment system of claim 16, wherein upon completion of the unfold process, the corn head hydraulics are configured to actuate the first and second lock actuators from the unlocked positions to the locked positions.

18. The corn head adjustment system of claim 13, wherein, during the unfold process, the corn head hydraulics is configured to initially maintain the position of the first and second deck plate actuators, and wherein, upon completion of the unfold process, the corn head hydraulics is configured to reposition the first and second deck plate actuators according to position values corresponding to a previous unfolded state.

19. The corn head adjustment system of claim 13, wherein the corn head hydraulics comprises a single inlet configured to receive the fluid from the source in order to actuate the first and second fold actuators and the first and second deck plate actuators.

20. The corn head adjustment system of claim 13, wherein the first and second fold actuators are dual-acting, actively controlled cylinder and piston arrangements.

* * * * *